Figure 1:
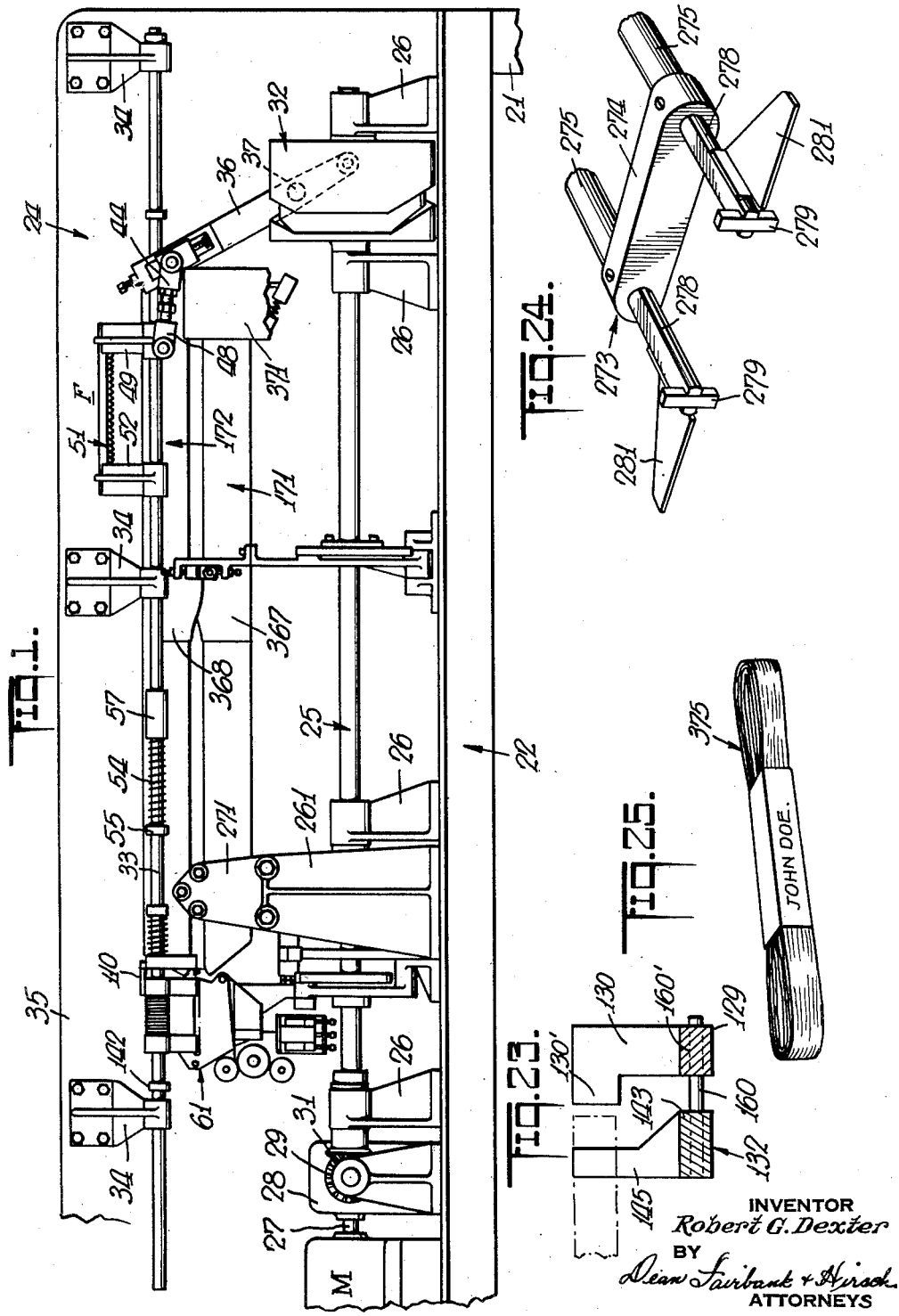

Oct. 13, 1953 R. G. DEXTER 2,654,980
HANK WINDING MACHINE
Filed Jan. 11, 1950 10 Sheets-Sheet 1

INVENTOR
Robert G. Dexter
BY
Dean Fairbank + Hirsch
ATTORNEYS

Oct. 13, 1953

R. G. DEXTER 2,654,980

HANK WINDING MACHINE

Filed Jan. 11, 1950

10 Sheets-Sheet 2

INVENTOR
Robert G. Dexter
BY
Dean Fairbank & Hirsch
ATTORNEYS

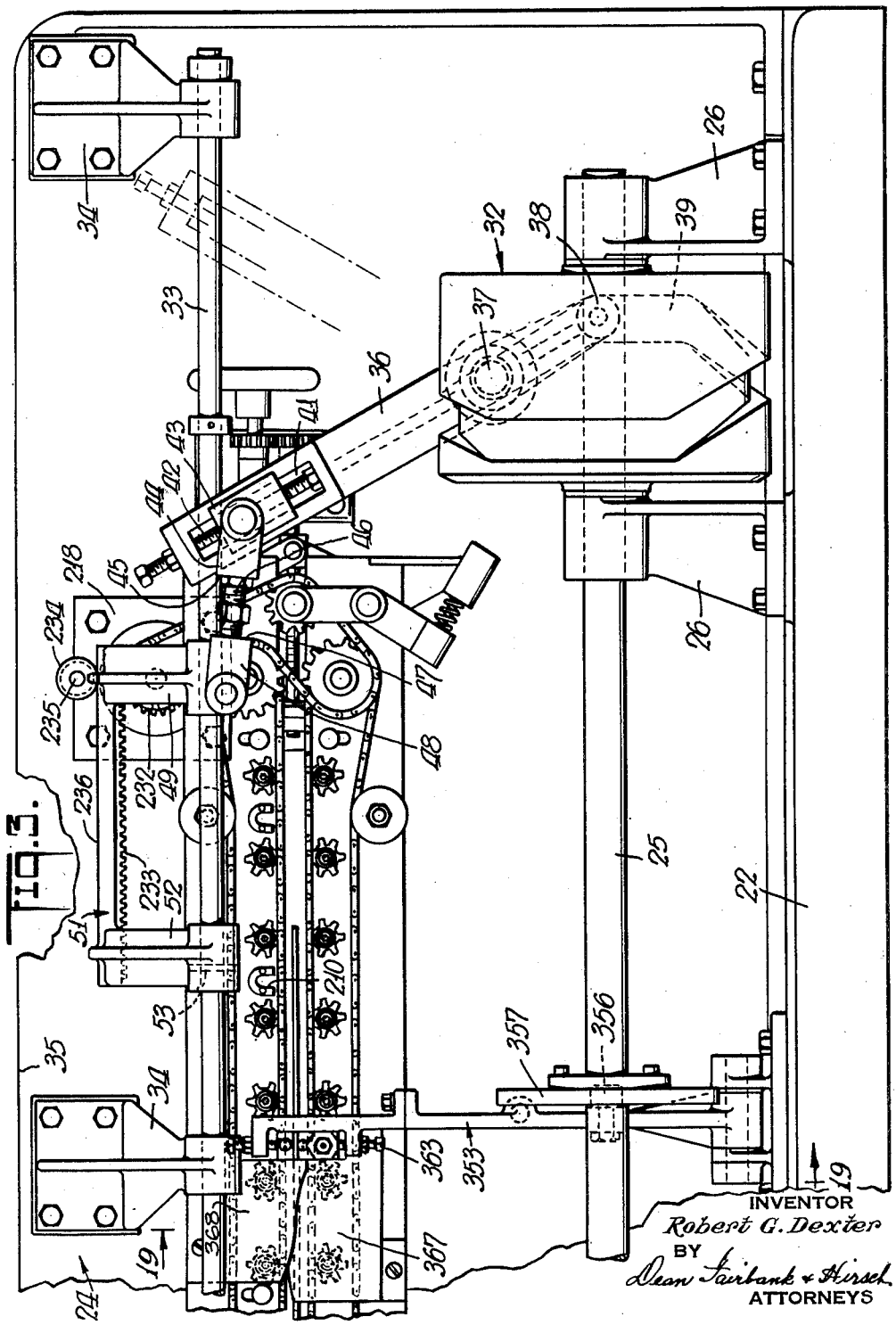

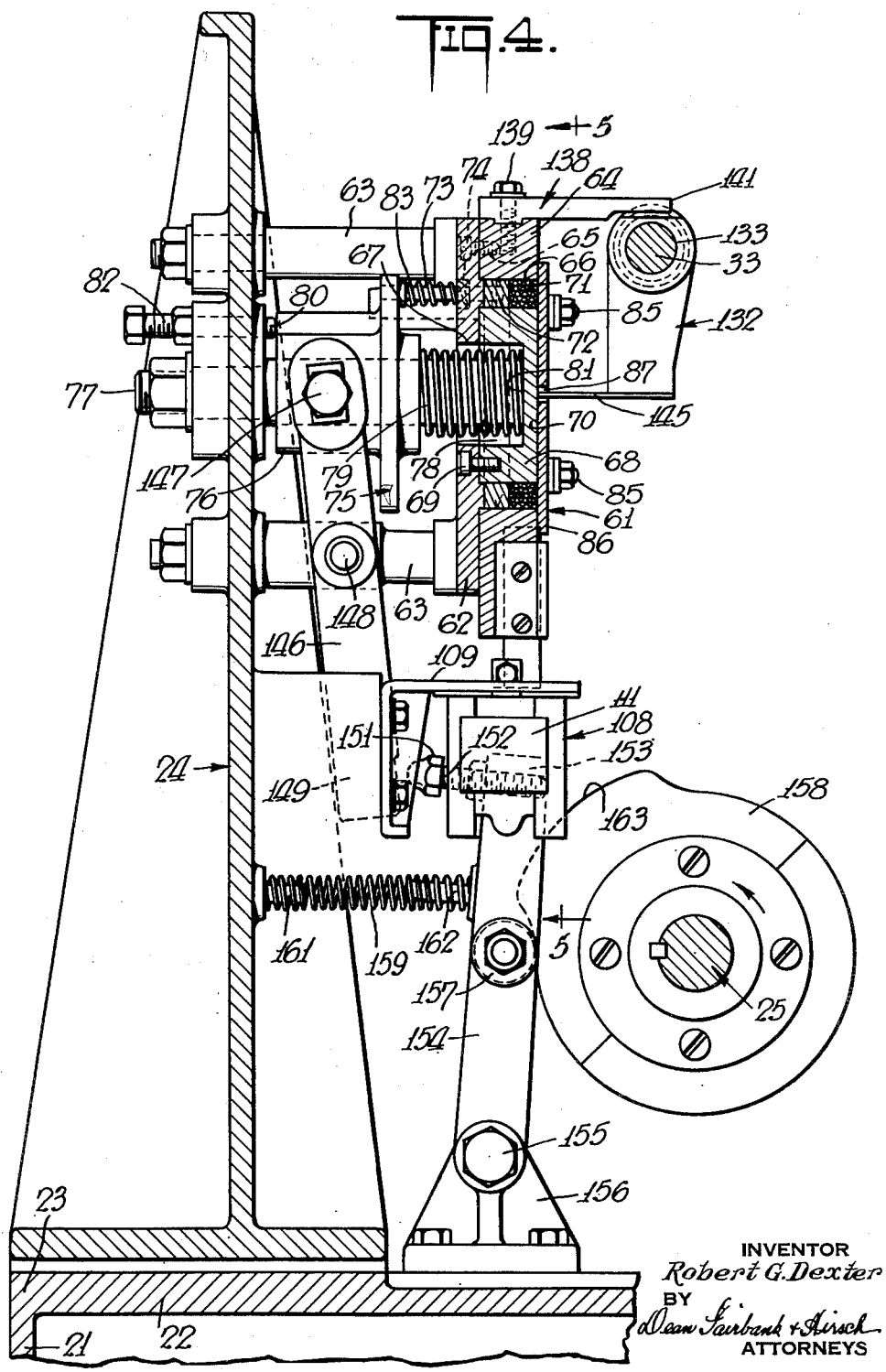

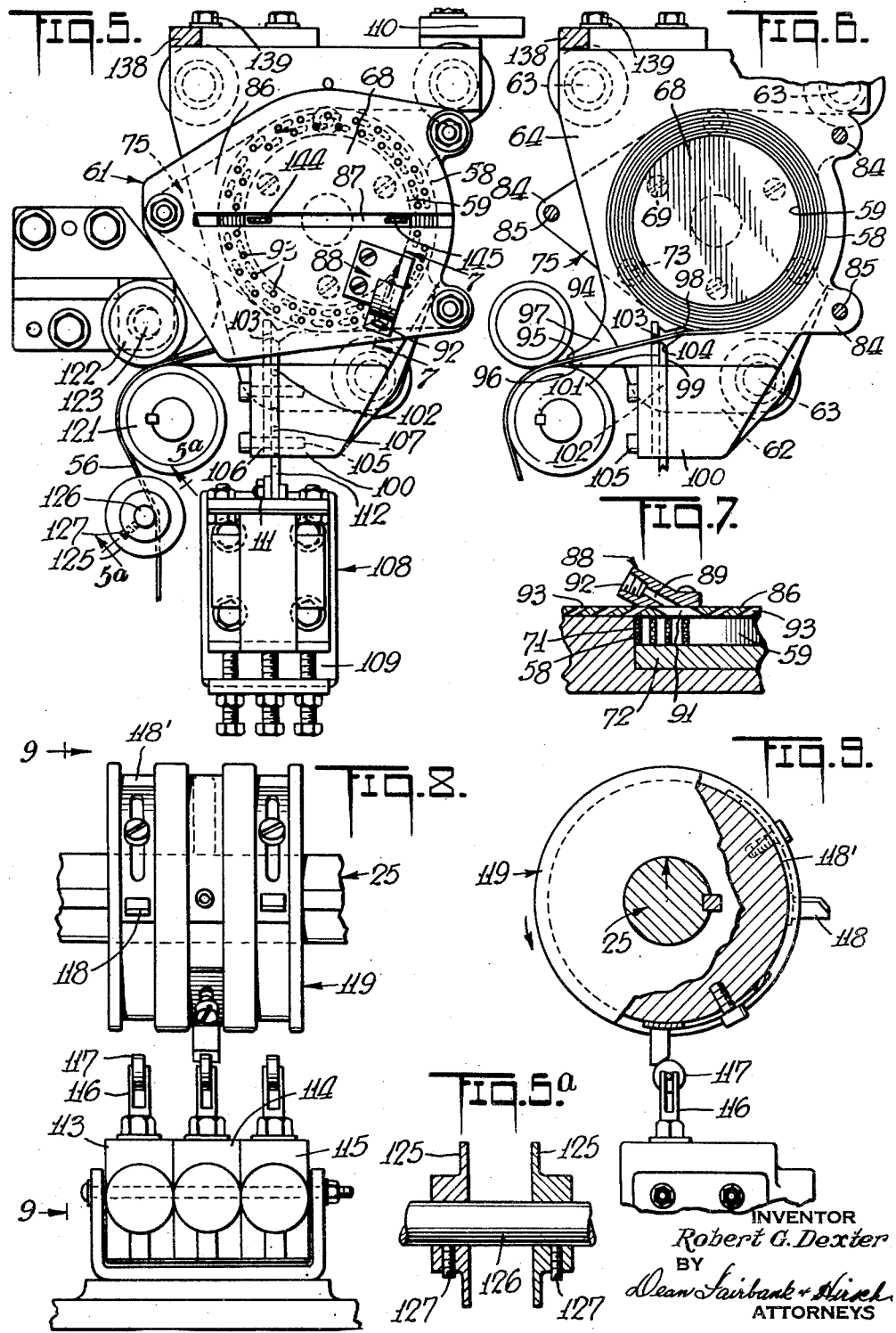

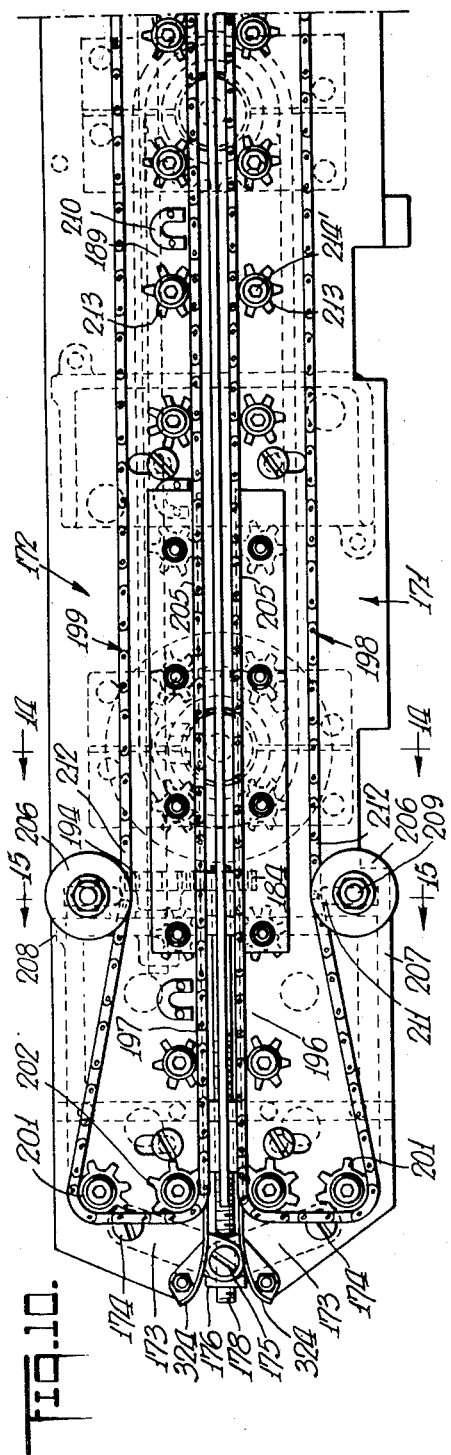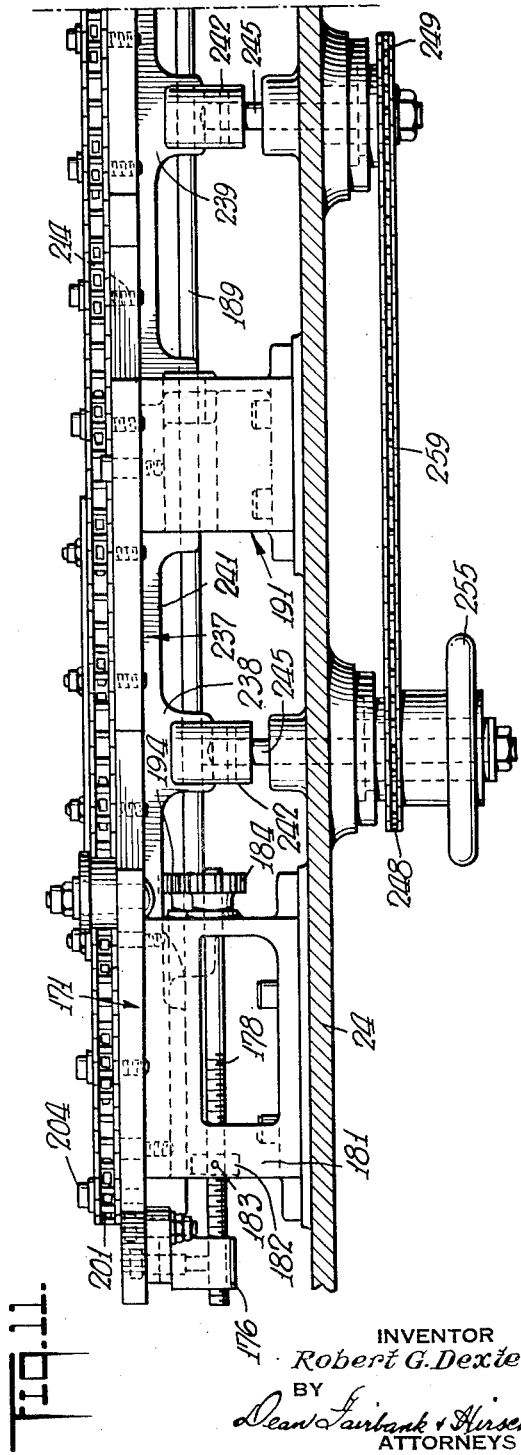

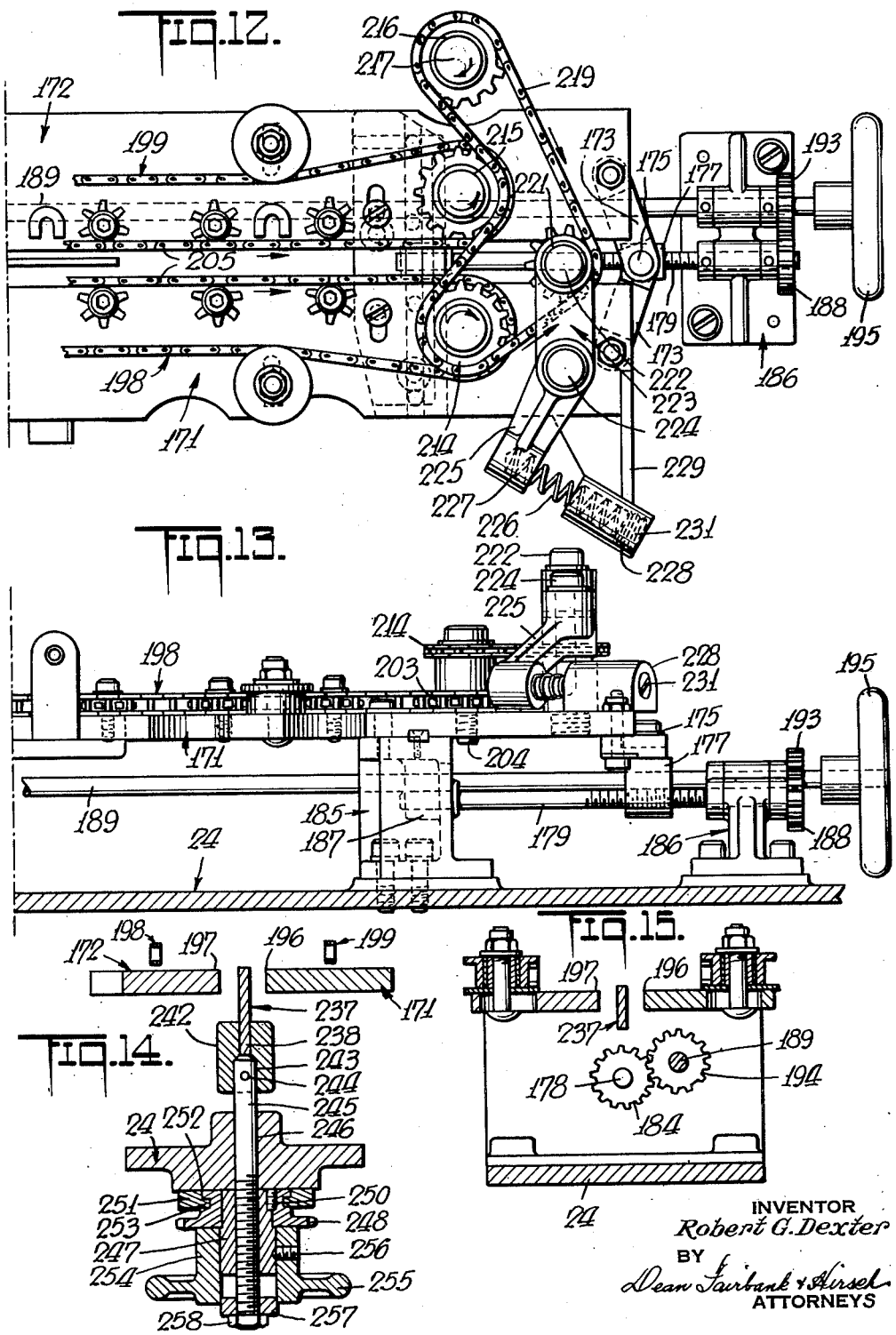

Oct. 13, 1953  R. G. DEXTER  2,654,980
HANK WINDING MACHINE
Filed Jan. 11, 1950  10 Sheets-Sheet 8

INVENTOR
Robert G. Dexter
BY
Dean Fairbank & Hirsch
ATTORNEYS

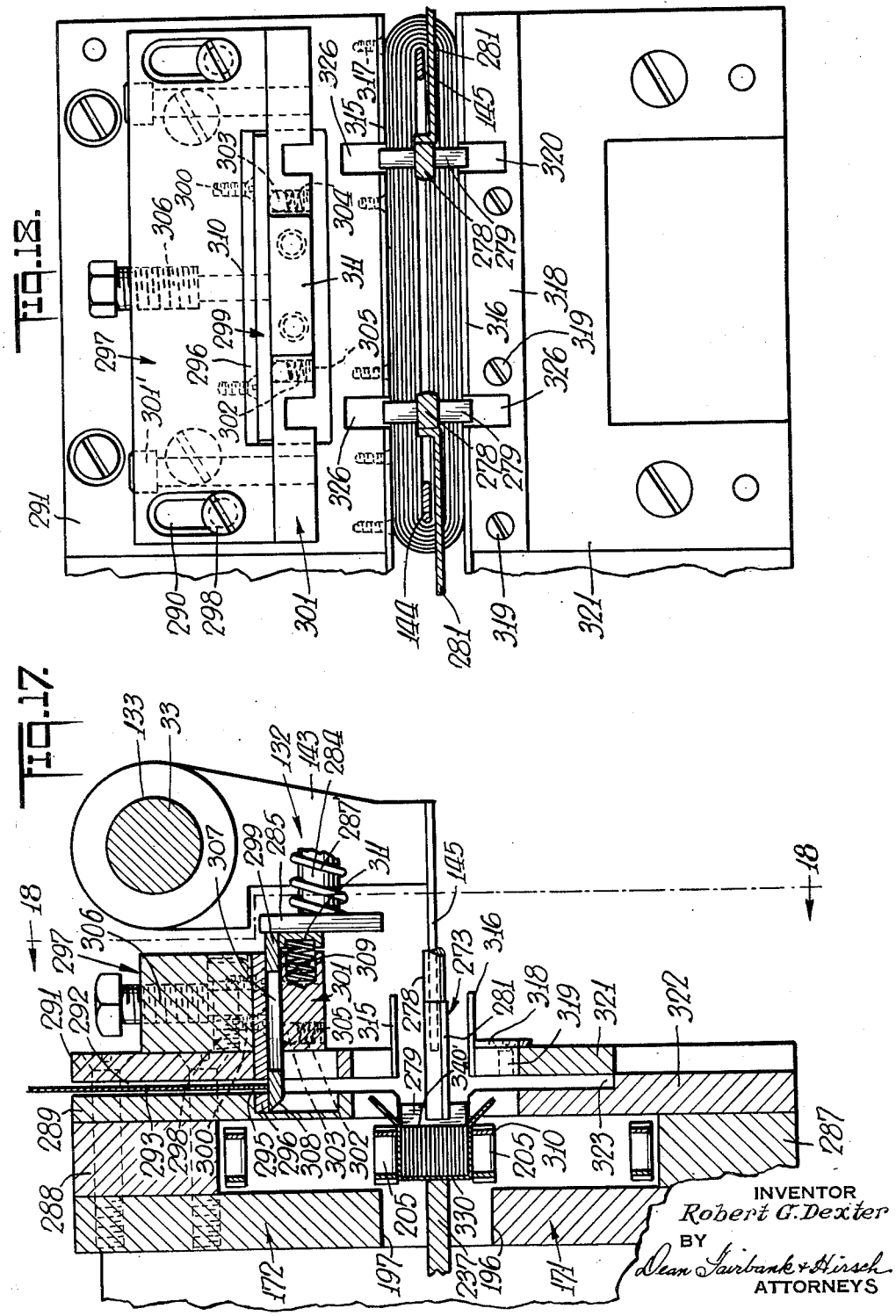

Oct. 13, 1953   R. G. DEXTER   2,654,980
HANK WINDING MACHINE
Filed Jan. 11, 1950   10 Sheets-Sheet 10
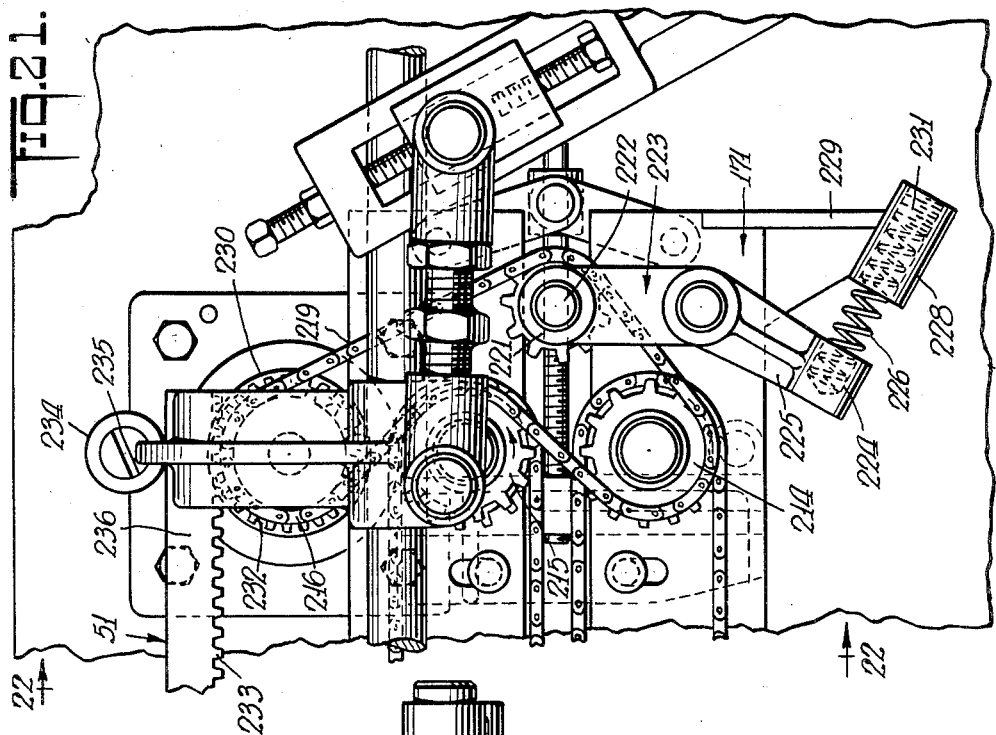
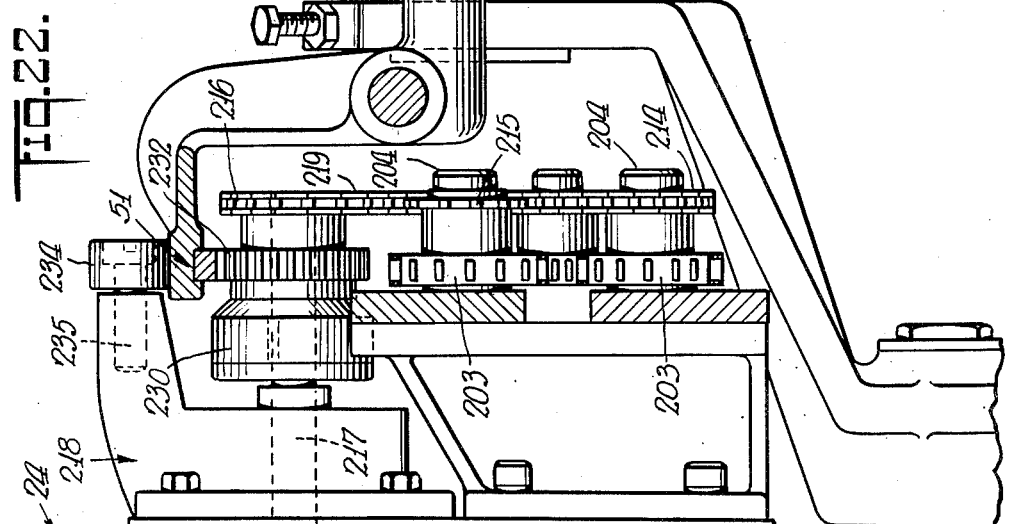
INVENTOR
*Robert G. Dexter*
BY
*Dean Fairbank + Hirsch*
ATTORNEYS Patented Oct. 13, 1953

2,654,980

UNITED STATES PATENT OFFICE 2,654,980

HANK WINDING MACHINE

Robert G. Dexter, Lexington, Mass., assignor, by mesne assignments, to Continental Elastic Corporation, New Bedford, Mass., a corporation of Delaware Application January 11, 1950, Serial No. 138,031

47 Claims. (Cl. 53—49)

The present invention relates to automatic machines for winding hanks of tape, generally, and has a particular application to the winding of hanks of elastic tape, and in preferred embodiments also seals a band about the hank to produce a package of such tape.

Unless a predetermined length of tape can be wound and formed into an elongated, flattened hank, banded and the band sealed, at a relatively high rate of speed and with a minimum of handling, the cost of packaging tape is often greater than the cost of the tape itself, and unless the finished package is neat and uniform it is likely to be unsalable except as a "second."

Because of the stretch of elastic tape due to tension applied thereto during the winding operation or during its feed to the winder, if a band should be placed around the hank of tape and sealed while the hank is under stretching tension, the ends of the hank are likely to spread apart unevenly when such tension is released, thereby distorting the package and possibly even tearing its band and rendering the resultant package unsalable except as a "second." In addition, where such stretching occurs, accurate measurement of the length of tape is difficult.

It is accordingly among the objects of the invention to provide an automatic winding machine for forming hanks from predetermined lengths of tape, placing bands around such hanks and sealing such bands, to produce uniformly perfect packages of tape, which machine is compact and rugged in construction, and functions with a minimum number of operating parts, none of which is delicate or likely to become deranged, and is capable of continuous operation with high output for long periods without attention and the working parts of which are readily accessible for maintenance and repair and the cost of upkeep of which is low.

A more specific object is to obtain the foregoing object with elastic tape and to produce banded hanks of such elastic tape that are neatly wound and that do not present any distortion due to elastic return following release of tension in winding.

According to the invention, a plurality of operating stations are provided to which stepping means advance the stock successively to perform the following operations: to wind a predetermined length of tape into a plurality of superposed generally circular loops or convolutions, to elongate such convolutions and thereby flatten the same to form a hank, to place a band around such hank, to fold one of the ends of the band over the other and to seal such folded-over ends.

According to one aspect of the invention the winding of the tape is performed by a winding head into which tape is fed from a source of supply, said winding head having associated tape propulsion means to wind such convolutions and also having associated means to sever the desired length of such tape after the convolutions have been wound.

According to another feature of the propulsion of the tape to position it in convolutions with respect to the head is performed pneumatically by an air nozzle to feed and lay the tape in place, preferably in a cavity within the winding head.

Associated with the winding head is a pair of relatively movable transfer means onto which the convolutions may be moved so that the transfer means are encompassed by such convolutions. Means are provided, associated with said transfer means, to draw them apart, whereby the convolutions thereon will be elongated and flattened to form a hank.

In a specific embodiment of the machine herein chosen to illustrate my invention, the winding station includes a winding head having a substantially circular, preferably annular cavity therein closed by a cover plate and into which the continuous length of tape may be fed. The air nozzle associated with the cavity is directed to blow air into the cavity generally in tape feeding direction, thereby to wind the tape into convolutions. Desirably the air is blown against one of the walls, preferably the inner wall of the cavity which result is accomplished by directing the nozzle substantially tangentially toward such inner wall.

Such winding operation, by pneumatic propulsion of the tape, avoids the application of substantial tension to the tape with the result that deformation due to the resilient return of stretched elastic tape is avoided.

Means are provided, operative after such convolutions have been wound, for moving the cover plate of the winding head outwardly away from the cavity that it closes, and means are also provided in said cavity for moving such convolutions therefrom over and to encompass transfer means which are a pair of spaced fingers that extend through a slot diametrically across said cover plate.

Associated with the banding station and cooperating therewith, is a conveyer system that may include a pair of belts having spaced parallel runs. Means are provided in said banding station to move the hank off its transfer fingers against a band and to force the hank and its associated band between the parallel runs of the conveyer in such manner that the ends of the band extend forwardly of such parallel runs.

Through a transmission from a main drive motor the conveyer is advanced in step by step movement to the sealing station. Means are provided to fold one of the forwardly extending ends of the band over the other during the course of such movement and means are provided at the sealing station to join together said folded over ends when the conveyer is at rest.

Figure 2:
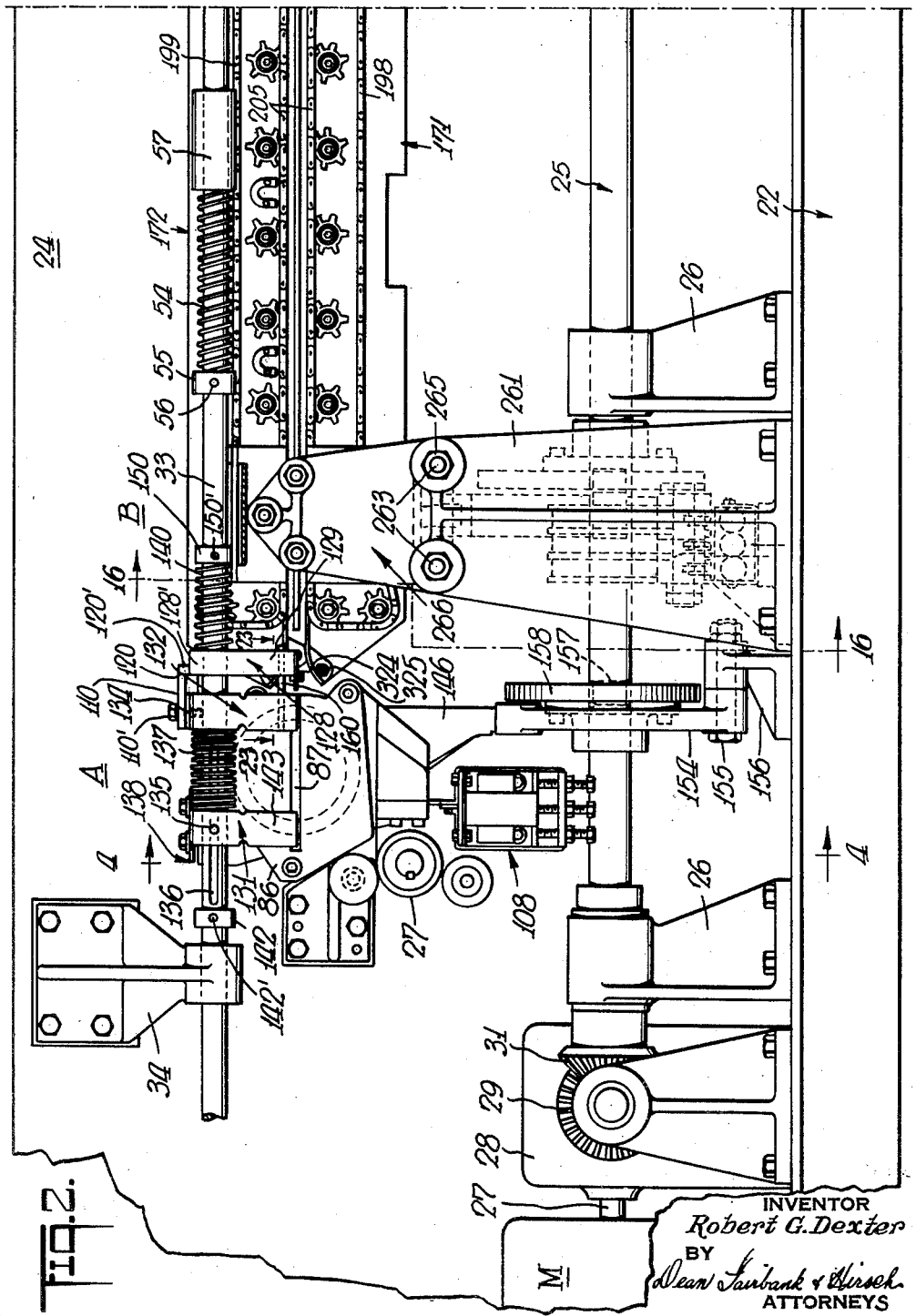
Figure 16:
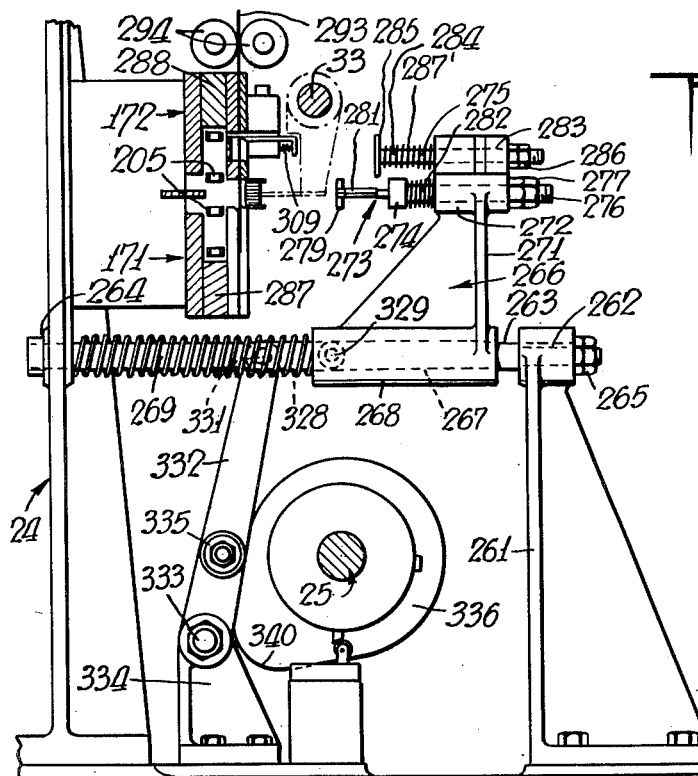
Figure 19:
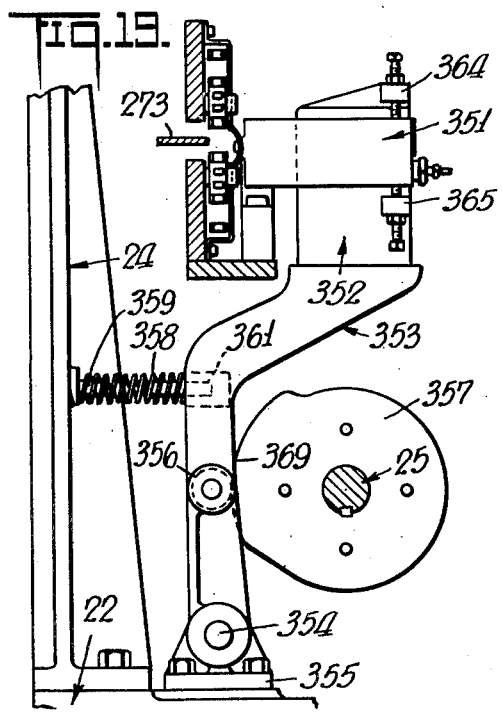
Figure 20:
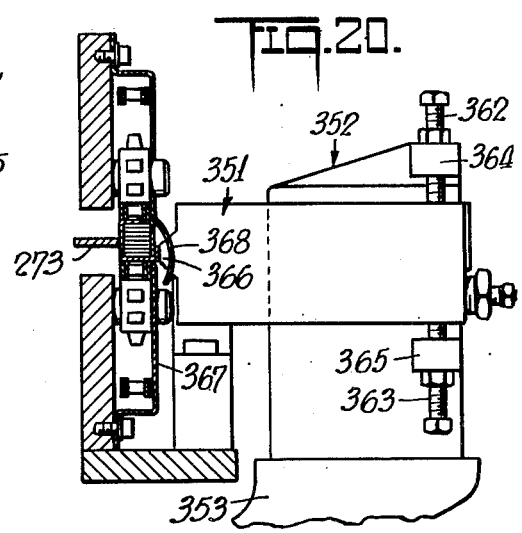

In the accompanying drawings in which are shown one or more of various possible embodiments of the several features of the invention, Fig. 1 is a fragmentary diagrammatic front elevational view of the machine, Figs. 2 and 3 are front elevational views of the machine on a larger scale showing the left and right hand end of the machine respectively, Fig. 4 is a transverse sectional view on a larger scale taken along line 4—4 of Fig. 2, Fig. 5 is a front view of the winding head taken along line 5—5 of Fig. 4, Fig. 5a is a sectional detail view on a larger scale taken along line 5a—5a of Fig. 5, Fig. 6 is a view similar to Fig. 5 with the cover removed from the winding head, Fig. 7 is a sectional detail view taken along line 7—7 of Fig. 5, Fig. 8 is a fragmentary detail view on a larger scale showing the micro-switches and actuating mechanism therefor, Fig. 9 is a side elevational view taken along line 9—9 of Fig. 8, Figs. 10 and 12 are side elevational views of the conveyer mechanism on a larger scale showing the left and right end of the conveyer mechanism respectively, Figs. 11 and 13 are top plan views of the conveyer mechanism similar to Figs. 10 and 12, Fig. 14 is a transverse sectional view taken along line 14—14 of Fig. 10, Fig. 15 is a transverse sectional view taken along line 15—15 of Fig. 10, Fig. 16 is a transverse sectional view taken along line 16—16 of Fig. 2, Fig. 17 is a fragmentary detail view on a larger scale similar to Fig. 16 showing the hank in the conveyer, Fig. 18 is a front elevational view taken along line 18—18 of Fig. 17, Fig. 19 is a transverse sectional view taken along line 19—19 of Fig. 3, Fig. 20 is a fragmentary detail view on a larger scale, similar to Fig. 19, Fig. 21 is a fragmentary detail view on a larger scale of the conveyer belt drive, Fig. 22 is a transverse sectional view taken along line 22—22 of Fig. 21, Fig. 23 is a sectional detail view taken along line 23—23 of Fig. 2, Fig. 24 is a fragmentary perspective view on a larger scale of the pusher member, and Fig. 25 is a perspective view on a larger scale of the finished article.

Although various types of cams, gears and sprocket wheels or other mechanisms may be employed for operating the constituent elements of the machine in timed relation, and there are many possible ways of driving them from a motor or other source of power, a particularly desirable arrangement is shown in the drawings.

Referring now to Figs. 2 and 4 of the drawings, the machine comprises a conventional frame 21 supporting a bed 22 having near the back edge 23 thereof an upstanding rear wall 24 on which are mounted substantially all of the major operating parts of the machine.

Extending longitudinally of the bed 22 in front of the rear wall 24 is the cam shaft 25 rotatably mounted in a plurality of upstanding bearing brackets 26 affixed to the bed 22 and spaced along the length thereof.

Suitable means are provided to rotate cam shaft 25. Such means may comprise a motor M desirably mounted upon bed 22 and connected by a shaft 27 to a reduction gear box 28 which, as it is itself conventional and forms per se no part of this invention, will not be further described. Through the reduction gearing in gear box 28 is driven a bevel gear 29 which meshes with a corresponding bevel gear 31 affixed on one end of cam shaft 25 to rotate the latter.

A barrel cam 32 (shown in Figs. 1 and 3) is desirably affixed on cam shaft 25, near the other end thereof preferably between two bearing brackets 26 to minimize vibration. Cam 32, through suitable linkage reciprocates a horizontal drive rod 33 slidably mounted in outstanding bearing brackets 34 affixed to the rear wall 24 near the upper edge 35 thereof.

The linkage to reciprocate drive rod 33 is clearly shown in Fig. 3 and desirably comprises a lever 36 pivotally mounted as at 37 upon the rear wall 24 and having suitable means, such as a roller 38, at its lower end riding in the groove 39 of the barrel cam 32. An adjustment screw 42 carrying a sleeve 43 threaded thereon, is positioned in a longitudinal slot 41 in the upper end of lever 36. Pivotally attached to and straddling sleeve 43 is a yoke 44, the cross piece 45 of which is adjustably connected by screw 46 to the cross piece 47 of a yoke 48. As sleeve 43 cannot rotate by reason of the yoke 44 attached thereto, rotation of screw 42 will effect longitudinal displacement of said sleeve in slot 41. The yoke is pivotally connected to and straddles the lower end of one of the vertical legs 49 of a rack member 51 which lies parallel to the plane of the rear wall 24, the drive rod 33 extending through longitudinally aligned bores in the lower ends of vertical legs 49 and 52 unitary with the rack, said lower ends being affixed to said drive rod 33 by pins 53.

Means are provided to prevent longitudinal play of drive rod 33 due to the relatively loose fit of roller 38 in groove 39 of cam 32. Such means, as shown in Fig. 2, desirably comprises a coil spring 54 positioned around drive rod 33 between a collar 55 affixed thereon by set screw 56 and a bearing 57 rigidly mounted with respect to rear wall 24 and through which drive rod 33 extends. Thus, drive rod 33 will normally be urged toward the left as shown in Figs. 2 and 3, thereby retaining roller 38 against the right hand wall of groove 39 and thus preventing longitudinal play of the drive rod.

Along the length of the machine are a sequence of operating stations at which the tape is successively wound, formed into a hank, banded and the band sealed, stepping means being provided to move the material from station to station.

The operating stations and conveyer means will now be described in detail.

*Winding station*

As shown in Figs. 4, 5 and 6 the winding station includes a winding head 61, preferably a circular hub 68 around which the tape is wound. The hub 68 is desirably affixed by screws 69 to the periphery of a circular opening 67 in a back plate 62 positioned parallel to and spaced from the rear wall 24 by a plurality of spacers 63. A front plate 64 is affixed to back plate 62 by screws 65 and has a circular opening 66 therethrough encompassing hub 68 and concentric with a circular opening 67 in back plate 62. Hub 68 is so positioned on back plate 62 as to be concentric with openings 66 and 67, and extends through opening 66 with the top 70 of the hub lying flush with the surface of front plate 64. Thus, a substantially circular, preferably annular cavity 71 is defined between the wall 58 of opening 66 and the wall 59 of the hub 68.

Means, desirably a cover plate 86, rests against front plate 64 to close annular cavity 71. Cover plate 86 which is desirably of transparent material such as plastic, has a horizontal slot 87 therethrough extending from near one edge of cover plate 86 across the diameter thereof to and through the diametrically opposed edge thereof.

Although any suitable means could be used to mount the cover plate, in the embodiment herein shown a pusher plate 75 is provided extending parallel to back plate 62 to the rear thereof and rigid with a collar 76 slidably mounted on a horizontal rod 77. The latter is affixed at one end to rear wall 24 and the free end of the rod 77 extends into an axial cavity 78 in the rear of hub 68. Tensed coil spring 79 encompasses rod 77 and is positioned between pusher plate 75 and the floor 81 of the cavity 78, thereby normally retaining the pusher plate 75 and collar 76 in their rearmost position on rod 77 adjacent rear wall 24, as limited by an adjustment screw 82, desirably threaded through rear wall 24 and abutting at its free end 80 against collar 76.

As shown in Figs. 5 and 6, pusher plate 75 has extensions 84 that protrude beyond the edges of the back and front plates 62 and 64 respectively. Each of said extensions 84 has a horizontal pin 85 affixed thereto at one end, which pins 85 normally extend beyond the front plate 64 and are rigidly affixed to said cover plate.

Although other means could be used to wind the tape around the hub 68 in the annular cavity 71 of the winding head, in the preferred embodiment herein shown, an air inlet member or nozzle 88 is associated with annular cavity 71 and is desirably rigidly affixed to the outer face of the cover plate 86 and extends obliquely thereto as shown. The nozzle 88 desirably has a bore 89 therethrough with the outlet end 91 of the bore positioned over the annular cavity 71 and directed to blow therein toward the inner wall 59 of the cavity substantially tangentially toward such wall as shown in Figs. 5 and 7. Thus when a source of compressed air is applied to the inlet end 92 of bore 89 the air will flow obliquely in the direction of the arrow and into annular cavity 71 in a counterclockwise direction.

Cover plate 86 also desirably has a plurality of air escape bores 93 therein of much smaller diameter than bore 89 of nozzle 88. Bores 93 extend obliquely through cover plate 86 into annular cavity 71 and are inclined in a direction opposite to the inclination of the bore 89. In Fig. 5, two rings of bores 93 are illustratively shown, although more or less could be provided.

In order to provide a passageway into annular cavity 71 for the tape to be wound, an obliquely extending slot 94 is provided in the lower end of front plate 64 at the left side thereof as shown in Figs. 5 and 6. The slot 94 desirably extends upwardly from its inlet 95 at the nose end 96 of a laterally extending portion 97 of front plate 64 and has an outlet 98 leading into annular cavity 71.

In order to cut the tape after it has been wound, a tape cutter which desirably comprises a pair of cutting blades 101 and 102, is positioned in a vertical slot 99 desirably formed in the lower portion 100 of front plate 64, which slot extends through the passageway or slot 94 slightly to the rear of the outlet 98 thereof. One of said blades, illustratively blade 101, has a transverse slot 103 therein aligned with oblique slot 94 and through which the tape may pass. The other blade, i. e., blade 102, which has a cutting edge 104 at the upper end thereof, lies flush against blade 101 with the cutting edge 104 normally positioned below transverse slot 103.

By means of transverse screws 105 threaded into the lower portion 100 of front plate 64 and passing through circular openings 106 in blade 101 and elongated vertical slots 107 in blade 102, the blades are retained in slot 99 with blade 101 fixed and blade 102 slidable therealong to perform the cutting operation.

Suitable means are provided to reciprocate movable blade 102 so that its cutting edge 104 may pass by the transverse slot 103 in fixed blade 101 and cut the tape passing therethrough. Such means may comprise a solenoid 108 desirably mounted beneath the winding head 61 on a bracket 109, with its armature 111 affixed to the end 112 of movable blade 102 which extends below the lower end 100 of front plate 64, as is clearly shown in Fig. 5.

To control the flow of air into air inlet member 88 and to energize the solenoid 108, all in properly timed relation, a plurality of micro-switches 113, 114 and 115 are desirably provided as shown in Figs. 8 and 9. The micro-switches which respectively control the turning off of the air, the turning on of the air and the energization of the cutter solenoid 108, are preferably positioned in side by side relation and affixed to the bed 22 of the machine beneath cam shaft 25.

Each of the micro-switches has an upstanding trip finger 116 associated therewith, preferably having a roller 117 at the upper end thereof. The rollers 117 are each in the path of movement of an associated adjustable dog or lug 118 rigid with an arcuate piece 118' mounted on a drum 119 affixed to the cam shaft 25, the arcuate pieces each being adjustable along the periphery of the drum in order that exact timing may be effected.

Micro-switch 115 which controls the cutter solenoid 108, is connected thereto by suitable circuits and micro-switches 113 and 114 which control the turning off and on of the air respectively, are connected to a double action solenoid which controls a two-way air valve, the latter being connected to a source of compressed air, and by a suitable air line to the air inlet member 88.

As the above-mentioned double action solenoid and two-way air valve, which may be mounted on the back of the rear wall 24, are conventional as is the source of compressed air and the air line and do not per se form part of this invention, they are not shown and will not be further described.

In order to feed the tape to be wound into the cavity 71 in the winding head, a roller 121 (Fig. 5) is desirably driven by a suitable transmission (not shown) from the main drive motor M. The transmission is so arranged that the desired length of tape will be fed into the cavity 71 during a predetermined cycle of rotation of the main cam shaft 25 which cycle is illustratively 270 degrees, such length being determined by the number of revolutions made by roller 121 during this 270 degree cycle.

Driven roller 121 has an idler roller 122 associated therewith, eccentrically mounted on a stud 123 affixed to and extending horizontally outward from the rear wall 24.

The eccentric mount permits adjustment of roller 122 to retain the tape tightly against roller 121 to effect drive of the tape without slippage yet such pressure is so light as not appreciably to compress such tape for if elastic tape is being wound, compression thereof would elongate the tape to impair accurate measurement thereof. Thus the tape will be positively driven into the annular cavity 71 through passageway 94, the entrance 95 of which is in close juxtaposition to the portions of the peripheries of rollers 121 and 122 which frictionally engage the tape.

As shown in Figs. 5 and 5a, in order that the tape be properly centered on the rollers 121 and 122, it is guided thereto between opposed flanges 125 which are adjustably mounted on a horizontal stud 126 affixed to the rear wall 24 and secured in spaced relationship on said stud by means of set screws 127 to suit the width of the tape being wound.

To set up the machine thus far described for operation, the arcuate pieces 118' on drum 119 are adjusted so that dogs 118 trip air-on microswitch 114, illustratively when the main cam shaft 25 has rotated to the position shown by the upright arrow in Fig. 9 which arbitrarily will be selected as indicating zero degrees, and to trip air-off micro-switch 113 and cuttermicro-switch 115 when the main cam shaft has rotated through an arc of approximately 275 degrees from the position indicated by said arrow. The transmission (not shown) from the main drive motor M is adjusted so that rotation of roller 121 will start when the main cam shaft is at zero degrees and will stop when the cam shaft is at 270 degrees.

The tape, which is desirably on a large roll or spool (not shown), is thereupon passed between flanges 125, which are adjusted to accommodate the width of the tape to be wound, between rollers 121 and 122 into passageway 94 thence through slot 104 in fixed blade 101 and into the cavity 71 so that the free end of the tape extends beyond the outlet end 91 of bore 89 of air inlet member 88.

Assuming the main cam shaft 25 to be at zero degrees as shown in Fig. 9, the main drive motor M is then turned on at which time microswitch 114 will be actuated by the associated dog 118 to turn on the air and the roller 121 will rotate to feed the tape into the cavity. The number of revolutions made by roller 121 during 270 degrees of revolution of the main cam shaft will determine the length of tape fed into the cavity.

The stream of air which flows in a counterclockwise direction through cavity 71 will pull on the tape and as the latter is constantly being fed into the cavity, it will readily be wound around hub 68 in convolutions without undue tension on the tape.

As the plurality of air escape bores 93 are inclined in direction opposite to the inclination of nozzle 88, they will tend to scoop up the air circulating in a counterclockwise direction in annular cavity 71 to permit escape of such air from the cavity.

As the bores 93 are of relatively small diameter considerable less than the diameter of air inlet bore 89, only a small amount of air will escape from such bores 93 in proportion to the amount of air passing thereby, consequently turbulences will be created in the cavity at the entrance to each bore 93 adjacent the outer edge of the tape being wound, which turbulences will act as "fingers" along the length of the winding tape, to exert tension and thereby aid in the winding operation.

When the main cam shaft has rotated 270 degrees, the rotation of roller 121 will cease, and no more tape will be fed into the cavity. However, as the air cut off micro-switch 113 is not tripped until the main cam shaft 25 has rotated to the 275 degree position, the air jet will continue until this time and the tape, which is held outside the winding head by rollers 121 and 122 will be pulled snugly around hub 68 without appreciable stretch.

Substantially simultaneously with the actuation of air-off micro-switch 113, micro-switch 115 will be tripped by its associated dog 118 thereby energizing cutter solenoid 108 to force the cutting edge 104 of blade 102 past the slot 103 in fixed blade 101 to cut the tape.

*Tape removal mechanism*

Suitable mechanism is provided to form a hank from the round convolutions of tape and to move such hank away from the winding head in order that the finished package may be formed.

This mechanism, as shown in Figs. 2 and 4, may comprise a pair of L-shaped brackets 131 and 132, each having a transverse bore 133 in the upper end thereof through which drive rod 33 extends. Bracket 132 is rigidly affixed to drive rod 33 by set screw 134 and bracket 131 is slidably mounted on drive rod 33 and keyed thereon by a cross pin 135 which extends through a longitudinal slot 136 in said drive rod 33. A coil spring 137 encompasses that portion of drive rod 33 between the upper ends of brackets 131 and 132 and normally urges slidable bracket 131 away from fixed bracket 132, the horizontal movement of slidable bracket 131 being limited by a stop member 138. The latter is affixed to the upper edge of front plate 64 by screws 139 and extends transversely outward therefrom, with the free end 141 of stop member 138 in the path of movement of the upper end of bracket 131 and normally engaged thereby.

A collar 142 is affixed by set screw 142' to rod 33 at the left end of slot 136 therein and is of such diameter that it may pass beneath the end 141 of stop member 138 when drive rod 33 is moved to the right by the transmission from the main cam shaft and barrel cam 32 heretofore described.

The vertical legs 143 of brackets 131 and 132 each has a rearwardly extending horizontal transfer finger 144 and 145 respectively, to transport the wound tape. Fingers 144 and 145 are aligned with the transverse slot 87 in cover plate 86 and normally extend through said slot slightly spaced from the face 70 of hub 68 within the periphery thereof as shown in Fig. 5.

In order to position the convolutions of tape on fingers 144 and 145 it is necessary that the convolutions be pushed out of the cavity 71 and that such cavity be opened to permit such removal. To this end, as shown in Fig. 4 a pusher ring 72 is desirably positioned in said cavity normally seated on the floor thereof.

A plurality of horizontal pins 73, illustratively three in number, are affixed at one end respectively to the pusher ring 72, desirably at equal intervals and extending rearwardly therefrom through openings 74 in back plate 62, the free ends of the pin 73 being affixed to pusher plate 75.

Each of the pins 73 is desirably encompassed by a coil spring 83 positioned between pusher plate 75 and the back plate 62 and they aid coil spring 79 in urging the pusher plate 75 toward rear wall 24, thereby normally retaining pusher ring 72 on the floor of the cavity 71.

It is to be noted that the lengths of pins 73 and 85 are so related that when pusher ring 72 is seated on the bottom of annular cavity 71 cover plate 86 will rest against front plate 64.

Although any suitable means could be used to reciprocate the pusher plate 75 which controls the pusher ring 72 and cover plate 86, in a preferred construction as shown in Fig. 4, a lever 146 is operatively connected at its upper end as at 147 to collar 76 and pivoted near its mid point as at 148 on spacer 63. The free end 149 of lever 146 is in the path of movement of a castle nut 151 threaded on an adjustment screw 152 carried by the upper end 153 of a lever 154, the latter being pivotally mounted at its lower end as at 155 on a bracket 156 affixed to the bed 22.

Lever 154 has a roller 157 rotatably mounted thereon which rides on the periphery of a cam 158 affixed to cam shaft 25, said roller being retained against said cam by a coil spring 159 compressed between the rear wall 24 and lever 154 and retained against vertical displacement by studs 161 and 162 rigid with said respective elements.

The operation of the tape removal mechanism is as follows:

After the convolutions of tape have been wound and cut in the winding head in the manner heretofore described, continued rotation of cam shaft 25 which is now at approximately the 280 degree position, will cause the high portion 163 of cam 158, which covers approximately 70 degrees of arc, to abut against the roller 157 of lever 154 pivoting the latter against the tension of spring 159. The castle nut 151 at the upper end of lever 154 will abut against the lower end 149 of lever 146 pivoting the latter about its pivot 148, thereby moving collar 76 and pusher plate 75 forward on rod 77 against the tension of coil springs 79 and 83. This simultaneously will move the cover plate 86 and pusher ring 72 forward and consequently slide the wound tape out of cavity 71 so that it will slide over the ends of transfer fingers 144 and 145 to encompass the latter.

Slightly after the sliding of the wound tape on fingers 144 and 145, say at about 285 degrees rotation of the main cam shaft, when the winding head is completely open, drive rod 33 will be moved forward, i. e., to the right, by reason of the pivoting of lever 36 by barrel cam 32 in the manner heretofore described.

As bracket 132 is rigidly affixed to drive rod 33 and as bracket 131 is slidably mounted thereon and forced away from bracket 132 and retained against stop 138 by coil spring 137, the forward movement of drive rod 33 will initially impart relative transverse movement to and spread apart the fingers 144 and 145 of the brackets by moving finger 145 longitudinally through slot 87 in cover plate 86. This spreading will continue until the collar 142' on drive rod 33 abuts against slidable bracket 131 at which time the convolutions of tape will have been elongated and flattened and formed into a hank. Thereafter as collar 142' will pass beneath stop 138, both brackets 131 and 132 and their associated fingers 144, 145 respectively will be moved to the right longitudinally of slot 87.

The position of collar 142' on rod 33 is desirably adjusted so that the maximum spread of the fingers 144, 145 will elongate the convolutions to their maximum length without such undue tension thereon as might unduly stretch the tape.

Continued movement to the right of the drive rod 33 will thereupon advance the hank longitudinally from between the cover plate 86 and pusher ring 72 and after the hank has been moved away from the winding head, at which time the main cam shaft has rotated to approximately 350 degrees, roller 157 will ride down the high portion 163 of cam 158 under the tension of spring 159. Thus, the upper end of lever 154 will no longer press against lever 146 and coil springs 79 and 83 will move pusher plate 75 back to its rearmost position to restore the cover plate 86 and pusher ring 72 to their original position, ready for the next winding operation.

As the convolutions of tape are moved out of the cavity in the winding head, the severed end of the tape might unroll and hang down. Means are accordingly provided to prevent such objectionable operation that might result in malfunctioning of the machine during the succeeding packaging operation.

As shown in Figs. 2 and 23, such means may comprise an L-shaped bracket 128 having a transverse bore 128' in the upper end thereof through which the drive rod 33 extends, thereby slidably mounting said bracket. The vertical leg 129 of the bracket has a rearwardly extending substantially L-shaped finger 130 rigid therewith (Fig. 23), said finger having a right angled portion 130' at the end thereof extending toward finger 145 of bracket 132.

As shown in Fig. 2, bracket 128 is normally urged toward finger 132 by means of a coil spring 140 encompassing rod 33 and compressed between a collar 150 affixed to said rod by a set screw 150', and the upper end of bracket 128. A guide pin 160 rigid with vertical leg 143 of bracket 132 extends through a bore 160' in the vertical leg 129 of bracket 128 to prevent transverse movement of bracket 128 so that leg 129 thereof is retained parallel to leg 143 of bracket 132.

In order that the convolutions of tape may be moved onto fingers 144, 145, when the latter are in position to receive such convolutions from the winding head as previously described, the portion 130' of finger 130 is normally spaced from finger 145 as shown in Fig. 23.

To this end a stop member 110 is desirably provided, affixed to the upper edge of front plate 64 by screws 110' and extending transversely outward therefrom with the free end 120 of stop member 110 being in the path of movement of a projection 120' affixed to the upper end of bracket 128 thereby restraining the movement of bracket 128 by coil spring 140, said end 120 being above the upper ends of brackets 131 and 132 so that they may pass therebeneath.

In the operation of the machine the convolutions of tape will be pushed onto transfer fingers 144, 145 as previously described. As the drive rod is moved to the right, as bracket 128 is slidably mounted thereon and retained against stop 110 by coil spring 140, the forward movement of the drive rod will bring finger 145 of bracket 132 affixed to drive rod 33 toward the right angle portion 130' of finger 130. Thus the convolutions of tape will be clamped between such portion 130' and finger 145.

Continuous movement to the right of the drive rod 33 will thereupon carry the upper end of bracket 131 and 132 beneath stop 110 and the bracket 128 will also be carried to the right by bracket 132, the pin 160 retaining such brackets in parallel relation.

*Conveyer system*

In order to transport the hank from station to station so that a completed package may be formed, a conveyer system is provided desirably comprising a pair of spaced parallel endless belts 198, 199 between which the hanks are retained as they are advanced.

The belts are desirably mounted in such manner that the inner runs 205 thereof extend parallel to each other and means are provided to afford adjustment of the distance between such inner runs so that they may tightly grip therebetween hanks of different thicknesses. To this end as shown in Figs. 10 to 13, the belts 198 and 199 desirably are positioned on the outer faces of a pair of parallel elongated mounting plates 171 and 172 respectively, which plates lie in the same plane, parallel to the rear wall 24 and are movable transversely toward and away from each other.

To afford such transverse movement, a link 173 is provided at each end of each of the mounting plates 171 and 172 respectively. Each of the links 173 is pivotally mounted at one end as at 174, desirably on the underface of the plates, so as to extend parallel thereto. The free ends of pairs of links 173 at adjacent ends of the mounting plates 171 and 172, are pivotally connected as at 175 to collars 176 and 177 threaded respectively on longitudinal screws 178 and 179 located near each pair of adjacent ends of the mounting plates 171 and 172 and positioned beneath said plates midway therebetween.

Screw 178 which is rotatably mounted in an outstanding bearing block 181 affixed to rear wall 24, is retained against axial displacement, by a collar 182 affixed thereon near one end thereof by set screw 183 and by a gear 184 affixed to the other end of screw 178 extending beyond bearing block 181.

In like manner screw 179 is rotatably mounted, desirably in a pair of outstanding bearing blocks 185 and 186 affixed to rear wall 24, and is retained against axial displacement, by a lock nut 187 affixed thereon at one end and by a gear 188 affixed thereon at the other end protruding beyond bearing block 186, the movable collar 177 desirably being positioned between said bearing blocks.

Extending longitudinally of the mounting plates 171 and 172 and rotatably mounted in bearing blocks 181, 185 and 186 is an adjusting rod 189 desirably supported near its mid point by an outstanding bearing block 191 also affixed to rear wall 24. Rod 189 is retained against axial displacement, by a gear 193 near one end thereof extending beyond bearing block 186 and meshing with gear 188, and by a second gear 194 also affixed on rod 189 near the other end thereof and meshing with gear 184 affixed on screw 178.

By means of a handwheel 195 affixed to the end of rod 189 extending beyond bearing block 186, the rod may be rotated to revolve meshed gears 184, 194 and 188, 193 and screws 178, 179 thereby to move the collars 176, 177 longitudinally thereon, to move the adjacent longitudinal edges 196 and 197 of the plates toward and away from each other as the case may be, through parallel motion links 173.

Although the belts 198, 199 could be of any suitable type they desirably are sprocket chains and each of the belts or chains 198, 199 respectively, desirably encompasses and passes around a pair of spaced transversely aligned sprocket wheels 201 and 202 near one end of each of the mounting plates and around a sprocket wheel 203 near the other end of each of the mounting plates. The sprocket wheels 201, 202 and 203 are each rotatively mounted on an outstanding stud 204 affixed to said mounting plates and sprocket wheels 202 and 203 are so positioned that the inner runs 205 of the sprocket chains extending therebetween will be parallel to each other and substantially aligned with the inner longitudinal edges 196, 197 of the mounting plates.

In order to provide tension on the sprocket chains 198 and 199, a plurality of rollers 206, preferably flanged as shown, and illustratively two in number, are positioned near each of the outer longitudinal edges 207 and 208 of the mounting plates and rotatably mounted on outstanding studs 209 which are transversely adjustable in slots 211 in each of the plates. As shown in Figs. 10 and 12 the rollers press against the outer run 212 of the sprocket chain and may be adjusted to take up any slack in the chain.

The inner runs 205 of the sprocket chains 198, 199 desirably mesh with a plurality of idler sprocket wheels 213, rotatably mounted on outstanding studs 214' affixed to the mounting plates, and are thus kept in substantially a straight line. To prevent sagging of the inner run 205 of upper chain 199 by reason of its weight, a plurality of desirably permanent magnets 210, only a few of which are illustratively shown in Figs. 3 and 10, are desirably affixed to mounting plate 172 between sprocket wheels 213 to retain the inner run 205 against its associated idler sprocket wheels.

Suitable means are provided to drive the sprocket chains 198, 199 on each of the mounting plates. Such means, shown in Figs. 3, 12 and 13 desirably comprise sprocket wheels 214 and 215 rigid with the pair of sprocket wheels 203 respectively (Fig. 22) so as to rotate therewith and rotatably mounted on the outer end of each of the studs 204 mounting sprocket wheels 203.

A drive sprocket wheel 216 is rigidly affixed on an outstanding shaft 217 rotatably mounted in a bearing block 218 affixed to rear wall 24. A drive sprocket chain 219 encompasses sprocket wheels 214 and 216 and rides against the periphery of sprocket wheel 215. Thus upon rotation of drive sprocket wheel 216 in a clockwise direction, sprocket wheel 214 will also rotate in a clockwise direction and sprocket wheel 215 will rotate in a counterclockwise direction. It is apparent therefore that sprocket chain 198 will rotate in a clockwise direction and sprocket chain 199 will rotate in a counterclockwise direction.

In order to compensate for the spreading adjustment of the mounting plates 171 and 172, means are provided to exert tension against sprocket chain 219 so that it will remain taut regardless of the spacing between sprocket wheels 214 and 215, which will vary depending upon the adjustment.

Although any suitable means may be used for the purpose, in the embodiment herein, a yieldable idler sprocket wheel 221 is associated with and engages drive sprocket chain 219. Sprocket wheel 221 is rotatably mounted as at 222 at the end of a pivoted lever 223 desirably having an obliquely extending portion 225 integral therewith at its free end. Means are provided to exert constant tension against the free end of lever 223 thereby to pivot the latter so that sprocket wheel 221 will press against sprocket chain 219 automatically to take up any slack therein. Such tension means may comprise a coil spring 226, seated at one end in a socket 224 formed integral with the free end of the lever 223 and positioned at its other end in the bore of a sleeve 228 rigidly mounted on a support arm 229 affixed to mounting plate 171. In order to retain coil spring 226 in the bore of sleeve 228 and permit adjustment of the tension thereof, a plug 231 is threaded into the open end of said sleeve 228.

To rotate drive sprocket wheel 216, as shown in Fig. 22, a gear 232 is rotatably mounted on the shaft 217 which mounts sprocket wheel 216 and is engaged by the teeth 233 of rack 51, which teeth are retained against gear 232 by a roller 234 resting on the upper surface of the cross piece 236 of the rack and rotatably mounted on an outstanding stud 235. A one way clutch 230 is associated with gear 232 to rotate shaft 217 when gear 232 is rotated in one direction, i. e., clockwise, as shown in Fig. 3, and to overrun and not drive shaft 217 when gear 232 is rotated in the opposite direction, i. e., counterclockwise. As any suitable clutch means of the above type may be used, such as the well known ratchet and pawl arrangement, it will not be further described.

*Banding station*

In order to position a band around the hank, it is necessary to move the hank off the transfer fingers 144, 145 and position such hank between the inner runs 205 of the conveyer chains, and a stop 237 is associated with said chains to limit the movement of the hank when it is moved off the fingers between belts 198 and 199 as shown in Figs. 11 and 14.

The stop 237 desirably comprises an elongated strip extending longitudinally of and lying in a plane at right angles to mounting plates 171 and 172 midway between the inner longitudinal edges 196, 197 thereof. Means are provided to afford in and out movement of the stop 237 with respect to the mounting plates. Although any suitable means could be used for this purpose, in the preferred embodiment shown herein, stop 237 has a pair of spaced tongues 238 and 239 on the inner edge 241 thereof and desirably formed integral therewith. Each of the tongues 238 and 239 is straddled by the bifurcated end portion of a hub 242 which may be affixed as by welding to the tongues. The other end of each of the hubs 242 has a longitudinal bore 243 therein in which is affixed, as by cross pin 244, one end of an adjusting screw 245, the other end of which extends through an opening 246 in rear wall 24.

Threaded on each of the screws 245 to the rear of rear wall 24 is a sleeve 247. Sprocket wheels 248 and 249 which encompass sleeves 247 respectively are affixed thereto by set screws 250, and are rotatably mounted in bearing members 251 affixed to the rear wall 24, coacting flanges 252 and 253 on the sprocket wheels 248, 249 and bearings 251 preventing axial displacement of the sprocket wheels and sleeves.

Referring to Fig. 14, the sleeve 247 extends beyond the sprocket wheel 248 into the bore of the hub portion 254 of a handwheel 255, affixed to the sleeve by a set screw 256. Each of the screws 245 desirably has a stop nut 257 and lock nut 258 threaded on the end thereof to limit the inward movement of the screws in the associated sleeves 247 when sprocket wheels 248 and 249, which are connected by sprocket chain 259, are rotated by handwheel 255.

To position a label around the hank, a banding station is provided associated with the input end of the conveyer system to which the hank is advanced on said fingers 144 and 145 with the severed end of the tape clamped between fingers 130' and 145 by the movement of drive rod 33 in the manner heretofore described.

As shown in Figs. 2, 16, 17 and 18 the banding station desirably comprises a pair of parallel, horizontal rods 263 affixed at their rear ends to rear wall 24 as at 264 beneath mounting plates 171 and 172 and extending at their front ends through transversely aligned openings 262 near the upper edge of an upstanding bracket 261 affixed to the bed 22 of the machine, and secured to said bracket by lock nuts 265.

Slidably mounted on rods 263 is a substantially L-shaped bracket 266, having a pair of parallel bores 267 in the horizontal leg 268 thereof, through which rods 263 extend. The bracket 266 is normally retained in its forward position against bracket 261 by coil springs 269 which encompass rods 263 respectively and are positioned between rear wall 24 and bracket 266.

The vertical portion 271 of bracket 266, near the upper edge thereof, desirably has a pair of transversely aligned openings 272 therein which mount a pusher member 273. This member, as shown in Fig. 24, desirably comprises a cross piece 274 having parallel rods 275 affixed near each end thereof respectively and extending at right angles thereto. The rods 275, are slidably mounted in openings 272 of bracket 266 and their axial displacement is limited by nuts 277 screwed upon the protruding threaded ends 276 thereof.

Longitudinally aligned with rods 275 respectively and affixed to the cross piece 274 on the opposite face thereof, are parallel fingers 278, the free end of each of which mounts a vertical pusher piece 279. Desirably each of the fingers 278 has a wing piece 281 affixed thereto and extending outward therefrom at right angles to said pusher pieces 279.

By means of coil springs 282 encompassing the rods 275 respectively, between the cross piece 274 and the bracket 266 the pusher member is normally retained in its extended position as shown in Fig. 16.

Affixed to mounting plates 171 and 172 respectively are spacer members 287 and 288 which extend parallel to and on each side of sprocket chains 198 and 199 respectively.

Spacer member 288 mounts plates 289 and 291 conformed to provide a vertical elongated slot 292 therethrough, which slot lies in a plane in front of the conveyer chains. Slot 292 is of sufficient width to accommodate a strip 293 of material, illustratively of paper, fed therethrough in timed relation from a spool (not shown) by means of driven rollers 294 rotated through a suitable transmission (not shown) desirably from the main drive motor.

The strip 293 extends through a slot 295 of corresponding dimensions in a horizontal blade 296 affixed by screws 300 to the underface of a mounting block 297 adjustably mounted on plate 291 by screws 298 which extend through vertical slots 290 in mounting block 297.

Associated with fixed blade 296 is a movable blade 299 slidably mounted in a support 301 affixed to mounting block 297 by screws 301'. As shown in Figs. 17 and 18, support 301 desirably has a plurality of vertical bores 302 therein each having a ball 303 urged against the underface of movable blade 299 by a coil spring 304 retained in the bore by a threaded plug 305. Thus the movable blade will always be urged against the fixed blade 296.

The movable blade 299 is desirably retained on support 301 and limited in its displacement by a vertical screw 306 threaded through mounting block 297 and extending through an opening 310 in fixed blade 296 and an elongated slot 307 in movable blade 299.

In order to retain movable blade 299 in its outermost position so that its cutting edge 308 will be spaced from the slot 295 in fixed blade 296 to permit free passage of the strip through the latter, a coil spring 309 is positioned between the back of support 301 and a depending flange 311 rigid with the end of movable blade 299 and in the path of movement of a disc 285 which, when moved against said flange will slide the movable blade 299 forward to cut the strip. The disc is desirably mounted on the end of a rod 284 positioned in an opening 283 provided in bracket 266 above openings 272 and midway therebetween, and retained in said opening 283 by lock nut 286. A coil spring 287' encircles rod 284 between disc 285 and bracket 266 and normally retains the disc in its extended position spaced from flange 311.

Positioned beneath cutting blades 296 and 299 are a pair of guides 315 and 316 each desirably comprising a horizontal strip. Guide 315 is affixed by screws 317 to the lower edge of plate 291 and is substantially longitudinally aligned with the outer face of the inner run 205 of sprocket chain 199.

Guide 316 which desirably has a vertical mounting portion 318 rigid therewith, is substantially longitudinally aligned with the outer face of the inner run 205 of sprocket chain 198 and is affixed by screws 319 to a plate 321 which in turn is affixed to a plate 322 affixed to spacer member 287. Plates 321 and 322 are conformed so as to define a vertical slot 323 therein aligned with vertical slot 291 and having substantially the same dimensions. Thus guides 315 and 316 extend in parallel planes and are movable toward and away from each other with mounting plates 171 and 172.

The left hand or entrance end of the guides 315, 316 as is clearly shown in Fig. 2 are outwardly flared as at 324 to provide a mouth into which the hank may be moved and desirably have a laterally extending portion 325 at such flared end whereby they may be affixed to the associated mounting plate. The guides are desirably of greater length than the hanks to be formed so that the entire length of the hank may be positioned therebetween.

As shown in Fig. 17, the channel formed by the opposed guides 315 and 316 is transversely aligned with the pusher member 273 and to ensure that the pusher pieces 279 will abut against the entire vertical width of the hank, as shown in Fig. 18, the guides 315 and 316, and associated plates on which they are mounted are provided with vertical slots 326 into which the pusher pieces 279 may advance when the pusher member is actuated by the mechanism now to be described.

As shown in Fig. 16, bracket 266 has a link 328 pivotally mounted thereon as at 329 between the parallel rods 263. The free end of the link is pivotally connected as at 331 to the upper end of a lever 332, pivoted at its lower end as at 333 to a bracket 334 affixed to the bed of the machine. Lever 332 has a roller 335 mounted thereon which rides on the periphery of a cam 336 affixed to cam shaft 25 and is retained against said cam by coil spring 269.

Thus, upon rotation of cam 336, lever 332 will be oscillated, to reciprocate bracket 266 and move the pusher member 273 between the guides 315 and 316, and move the disc 285 against the flange 311 of blade 299.

The operation of the conveyer system and banding station is as follows:

Continued forward movement of the drive rod 33 by the transmission from the main cam shaft 25 will advance the brackets 131 and 132, and the hank on fingers 144 and 145 will thereupon be moved between the flared ends 324 of the guides 315 and 316, and at the end of the forward movement of drive rod 33 the hank will be positioned between guides 315 and 316 transversely aligned with pusher member 273.

At this time when drive rod 33 is at rest, due to the configuration of cam 32 the high portion 340 of cam 336 will engage roller 335 on lever 332 to pivot the latter. Bracket 266 controlled by the movement of lever 332, will thereupon move on parallel rods 263 towards rear wall 24 against the tension of coil springs 269 and pusher member 273 mounted on bracket 266 will be moved towards guides 315 and 316.

Continued forward movement of the bracket 266 will cause the pusher pieces 279 to enter the slots 326 in guides 315 and 316 and as the pusher pieces which are positioned between fingers 144 and 145, move between the guides they will abut against the front face 340' of the hank, thereby moving the latter off fingers 144 and 145 of brackets 131 and 132, the portion 130' of finger 130 only resiliently clamping the tape and hence not impeding such operation. As the pusher pieces are of greater length than the vertical thickness of the hank and as the wing pieces 281 extend respectively beyond the ends of the hank as shown in Fig. 18, and lie in a plane below the horizontal plane of fingers 144 and 145, it is clear that the hank will be moved without bending or twisting.

The movement of the pusher member 273 will force the rear face 330 of the hank against the strip 293 which has been previously positioned in vertical slots 292 and 323 by rollers 294 and is now at rest. Substantially simultaneously with the movement of the hank against strip 293, the disc 285 carried by rod 284 will abut against the flange 311 at the end of movable blade 299 and move the cutting edge of the latter past the slot 295 in fixed blade 296 to sever the tape passing through such slot. Continued movement of the pusher member will thereupon force the hank and severed portion of the strip 293 between the inner runs 205 of the conveyer chains 198 and 199 as limited by stop 237.

The spacing of the conveyer chains 198 and 199 which depends upon the length of the strip being wound into a hank is adjusted by means of handwheel 195 so that the parallel inner runs 205 will be sufficiently spaced to receive the hank, and the position of the stop 237 is adjusted by handwheel 255, depending upon the width of the tape being wound, so that the rear face of the severed portion of the strip 293 against which the rear face 330 of the hank is moved will abut against the stop with the front face 340' of the hank extending forward of the inner runs 205 of the conveyer chain.

With the hank between inner runs 205 as shown in Fig. 17, the severed portion of the strip which is now in the form of a band will encompass the rear face 330 of the hank as well as the top and bottom faces thereof with the ends of the band extending beyond the front face 340' of the hank.

The coil springs 282 and 287' associated with the pusher member 273 and disc 285 limit the pressure that can be exerted by the pusher member and the disc against the hank and the movable cutting blade respectively so that accurate tolerances in the manufacture and adjustment of the machine will not be necessary.

After the hank and band are positioned between the inner runs of the conveyer chains, the high portion 340 of cam 336 will move away from roller 335 on lever 332 and the latter under the tension of coil spring 269 will pivot away from the rear wall 24 thereby moving bracket 266 and the pusher member 273 and disc 285 carried thereby back to their home position.

Simultaneously with the forward movement of the drive rod 33 which carries the hank from the winding station to the banding station, the movement of rack 51 carried by drive rod 33 will rotate gear 232 and through clutch 230 rotate shaft 217 and drive sprocket wheel 216 in a clockwise direction. Through the transmission heretofore described, from drive sprocket wheel 216 to conveyer belts 198 and 199, the belts will be advanced in a clockwise and counterclockwise direction respectively and advance the hank moved to the banding station during the previous forward movement of the drive rod to the next succeeding station.

At this time the winding operation heretofore described which starts when the cam shaft is at zero degrees as shown in Fig. 9 will again have begun, and continued rotation of cam shaft 25 will cause barrel cam 32 to move the drive rod, through the transmission heretofore described, to the left as shown in Fig. 1 and return the brackets 131 and 132 and fingers 144 and 145 to their initial position aligned with the winding head. During the course of such movement, bracket 128 will also move to the left until projection 120' thereof abuts against stop 110. At this time spring 140 will be compressed and finger 145 will move away from portion 130' of finger 130 so that finger 145 will be ready for the next operation. Although such movement of drive rod 33 will advance rack 51 and rotate gear 232 engaged thereby, the clutch associated therewith will not engage shaft 217 and hence drive sprocket wheel 216 will not be rotated and the sprocket wheel 216 will not be rotated and the sprocket chains 198, 199 will remain at rest.

In order to complete the package, that is, to fold the ends of the band over each other and seal such ends, which desirably have a thermoplastic coating thereon, a folding and sealing station is provided to which the hank and band therearound will be advanced during the stepping movement of the conveyer chain. Although any suitable arrangement may be used, a preferred construction will now be described in detail.

*Folding and sealing station*

As shown in Figs. 19 and 20 the folding and sealing station desirably comprises an electric heating element 351 mounted on a bracket 352 affixed to the upper end of a lever 353 pivoted at its lower end as at 354 on a bracket 355 affixed to the bed of the machine. Lever 353 has a roller 356 mounted thereon which rides against the periphery of a cam 357 affixed to cam shaft 25. Roller 356 is retained against such periphery by means of a coil spring 358 positioned between rear wall 24 and lever 353 and retained against vertical displacement by studs 359 and 361 affixed to said members respectively.

In order to provide for vertical and transverse adjustment of the heating element 351, the latter is desirably retained on bracket 352 by means of vertically adjustable screws 362 and 363 mounted in laterally extending lugs 364 and 365 respectively, affixed to the bracket. The front end of heating element 351 has a horizontal heating iron 366 associated therewith, extending parallel to the conveyer and desirably of greater length than the width of the band to be sealed.

Affixed to mounting plates 171 and 172 respectively, are folding members 367 and 368 which, when the forwardly extending ends of the band pass thereby during the movement of the conveyer chains, above described, will fold one of said ends, illustratively the upper end, over the lower end. As the construction and operation of such folding members are conventional they need not be further described.

The operation at the folding and sealing station is as follows:

During the intermittent movement of the conveyer chains the hank with its encompassing band will move past the folding members 367 and 368 which will fold the upper end of the band over the lower end thereof. The hank will thereupon be further advanced until it is transversely aligned with the heating iron 366 of heating element 351 at which time movement of the conveyer will cease.

At this time cam shaft 25 will have rotated sufficiently so that the high portion 369 of cam 357 will engage roller 356 and pivot lever 353 to move the heating element 351 towards the hank so that the heating iron 366 thereof will be transversely aligned with the folded over ends of the band and will engage such folded over ends. The application of heat to such ends will actuate the thermoplastic material thereon which will thereupon set and securely seal such ends together to retain the band around the hank, thereby forming the finished article 375 shown in Fig. 25.

After cam shaft 25 has rotated approximately 75 degrees, which will provide sufficient time for the sealing operation to take place, the high portion 369 of cam 357 will move away from roller 356. Lever 353 under the urging of coil spring 358 will pivot away from the rear wall 24 thereby moving the heating element 351 away from the article 375.

The next intermittent movement of the conveyer chain will advance the article 375 to the end of the conveyer chains at which point it will drop off desirably into a chute 371 for discharge from the machine.

The machine herein can operate for many hours without supervision, requiring as it does only an adequate supply of tape and banding strip and the resulting articles will be neat and symmetrical and have tape of uniform length.

Although it is within the scope of this invention to provide other operating stations along the conveyer chains at the end of each stepping movement thereof which may, for example, insert advertising material between the forwardly extending ends of the band, as such additional stations form no part of this invention, they will not be described.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A machine of the character described comprising means for winding convolutions from a length of tape, transfer means for such convolutions normally spaced therefrom, means for moving such convolutions from said winding means onto said transfer means to encompass the latter, means associated with said transfer means for elongating such convolutions thereby flattening the latter to form a hank and means for banding such hank.

2. A machine of the character described comprising means for winding convolutions from a length of tape, a pair of relatively transversely movable transfer means for such convolutions normally spaced therefrom, means for moving such convolutions from said winding means onto said pair of relatively movable transfer means to encompass the latter, means associated with said transfer means for effecting relative transverse movement therebeteween thereby to elongate and flatten such convolutions to form a hank, and means for banding such hank.

3. A machine of the character described comprising means for winding a plurality of convolutions from a length of tape, a pair of spaced relatively transversely movable fingers, normally spaced from such convolutions and associated with said winding means, means for moving such convolutions from said winding means onto said spaced fingers to encompass the latter, means associated with said spaced fingers for effecting such relative transverse movement therebetween to separate said fingers, thereby to elongate and flatten such convolutions to form a hank, and means for banding such hank.

4. A machine of the character described comprising pneumatic means for propelling a length of tape to wind the same in convolutions, a pair of spaced relatively transversely movable transfer means for such convolutions normally spaced therefrom, means for moving such convolutions from said winding means onto said transfer means to encompass the latter, means associated with said transfer means for effecting such relative transverse movement therebetween to separate said transfer means thereby to elongate such convolutions and flatten the latter to form a hank and means for banding such hank.

5. A machine of the character described comprising a winding head having a substantially circular cavity therein, a tape inlet into said cavity, an air nozzle associated with said cavity and directed to propel a length of tape thereinto to wind the same in convolutions, transfer means associated with said cavity, means operative for moving such convolutions from said cavity onto said transfer means to encompass the latter, means associated with said transfer means for elongating such convolutions thereby flattening the latter to form a hank and means for banding such hank.

6. A machine of the character described comprising a winding head having a substantially circular cavity therein, a tape inlet into said cavity, an air nozzle associated with said cavity and directed to propel tape forward through said inlet against a wall of said cavity to wind the tape in convolutions, a pair of spaced transfer fingers normally spaced from such convolutions, means operative for moving such convolutions from said cavity onto said transfer fingers to encompass the latter, means associated with said fingers for effecting relative transverse movement therebetween to separate said fingers, thereby to elongate and flatten such convolutions to form a hank, and means for banding such hank.

7. A machine of the character described comprising a winding head having a cavity therein, a tape inlet into said cavity, a cover plate over said cavity, an air nozzle associated with said cavity and directed to propel tape forward through said inlet to wind the tape in convolutions, transfer means for such convolutions, means for moving such cover plate away from said cavity and for moving such convolutions from said cavity onto said transfer means to encompass the latter, means associated with said transfer means for elongating said convolutions thereby flattening the latter to form a hank and means for banding such hank.

8. A machine of the character described comprising a winding head having a substantially circular cavity therein, a tape inlet into said cavity, an air nozzle associated with said cavity directed to propel tape forward substantially tangentially toward a wall of said cavity to wind the tape in convolutions, transfer means for such convolutions, means for moving such convolutions from said cavity onto said transfer means to encompass the latter, means associated with said transfer means for elongating said convolutions thereby flattening the latter to form a hank and means for banding such hank.

9. A machine of the character described comprising a winding head having a substantially annular cavity therein, said cavity having an inner and outer wall, a tape inlet into said cavity, an air nozzle associated with said cavity directed to propel tape forward substantially tangentially toward the inner wall of said cavity to wind the tape in convolutions, transfer means for such convolutions, means for moving such convolutions from said cavity onto said transfer means to encompass the latter, means associated with said transfer means for elongating said convolutions thereby flattening the latter to form a hank and means for banding such hank.

10. A machine of the character described comprising a winding head having a substantially annular cavity therein, said cavity having an inner and outer wall, a tape inlet into said cavity, a cover plate, an air nozzle associated with said cover plate and directed to blow obliquely into said cavity in tape feeding direction substantially tangentially toward the inner wall of said cavity to wind the tape in convolutions, said cover plate having a plurality of air escape bores therethrough inclined in a direction opposed to the inclination of said nozzle, transfer means for such convolutions, means for moving said cover plate away from said cavity and for moving such convolutions from said cavity onto said transfer means to encompass the latter, means associated with said transfer means for elongating said convolutions thereby flattening the latter to form a hank and means for banding such hank.

11. A machine of the character described comprising a winding head having a substantially circular cavity therein, a tape inlet into said cavity, a cover plate closing said cavity, an air inlet member associated with said cavity, having a bore therethrough directed obliquely toward a wall of said cavity in the direction of tape feed to propel and wind tape in convolutions in said winding head, air escape outlet means from said cavity, transfer means for such convolutions, means for moving said cover plate away from said cavity, and for moving such convolutions from said opened cavity onto said transfer means to encompass the latter, means associated with said transfer means for elongating such convolutions thereby flattening the latter to form a hank and means for banding such hank.

12. The combination set forth in claim 11 in which said air escape means comprises a plurality of bores in said cover plate over the cavity in said winding head, said bores extending obliquely through said cover plate and inclined in a direction opposed to the inclination of the bore of said air inlet member.

13. A machine of the character described comprising a winding head having a substantially circular cavity therein, a tape inlet into said cavity, a cover plate over said cavity having air escape outlets therethrough, means to feed a length of tape through said tape inlet into said cavity, an air inlet member associated with said cavity having a bore directed obliquely toward a wall of said cavity in the direction of tape feed to propel tape under pneumatic pressure through said tape inlet and wind it in convolutions within said cavity, a pair of relatively movable transfer fingers for such convolutions lying in a plane at right angles to said cover plate, means for moving said cover plate away from said cavity and for moving such convolutions from said open cavity onto said pair of relatively movable transfer fingers to encompass the latter, means associated with said fingers for drawing them apart to elongate such convolutions thereby to form a hank and means for banding such hank.

14. A machine of the character described comprising a winding head having a substantially circular cavity therein, a tape inlet into said cavity, a cover plate closing said cavity and having a slot extending thereacross from near one edge thereof through the diametrically opposed edge, an air inlet member associated with said cavity having a bore therethrough directed obliquely toward a wall of said cavity in the direction of tape feed to propel tape under pneumatic pressure through said tape inlet and wind it in convolutions within said cavity, a pair of spaced fingers extending at right angles to the plane of such convolutions with the ends of said fingers extending through the slot in said cover plate and normally spaced from such convolutions, means for moving said cover plate away from said cavity in direction parallel to the plane thereof, means in said cavity for moving such convolutions from said cavity onto the ends of said spaced fingers to encompass said fingers, means associated with said fingers to effect relative transverse movement therebetween longitudinally of said slot to elongate such convolutions in order to form a hank and means after said hank has been formed to band the latter.

15. The combination set forth in claim 14 in which the means in said cavity for moving such convolutions comprise a substantially circular displaceable pusher ring interposed between the floor of said cavity and such convolutions and rigidly affixed to said cover plate so as to move therewith.

16. A machine of the character described comprising means for winding tape in convolutions, means to feed tape to said winding means, means associated with said winding means to sever a predetermined length of tape fed thereto, transfer means for such convolutions, means for moving such convolutions from said winding means onto said transfer means to encompass the latter, means associated with said transfer means for elongating such convolutions thereby to flatten the latter to form a hank and means for banding such hank.

17. A machine of the character described comprising a winding head, means for winding convolutions in said winding head from a length of tape, a pair of spaced, relatively movable fingers, normally spaced from such convolutions and associated with said winding head, pusher means in said winding head to move such convolutions in direction at right angles to the plane thereof out of said winding head onto said spaced fingers to encompass the latter, means associated with said fingers for drawing them apart, thereby to elongate and flatten such convolutions to form a hank and means after such hank is formed to band the latter.

18. A machine of the character described comprising means for winding tape in convolutions, means to feed tape to said winding means, means associated with said winding means to sever a predetermined length of tape fed thereto, a pair of spaced, relatively movable fingers, normally spaced from such convolutions and associated with said winding means, pusher means associated with said winding means to move such convolutions therefrom onto said spaced fingers to encompass the latter, means associated with said fingers for effecting relative transverse movement therebetween to separate said fingers thereby to elongate and flatten such convolutions to form a hank, and means after such hank is formed to band the latter.

19. A machine of the character described comprising means for winding tape in convolutions, transfer means for such convolutions lying in a plane at right angles to the plane of such convolutions, means for moving such convolutions out of said winding means onto said transfer means to encompass the latter, banding means, and means associated with said transfer means for elongating such convolutions thereby flattening the latter to form a hank and for bringing such hank into alignment with said banding means.

20. A machine of the character described comprising a winding head having a substantially circular cavity therein, a tape inlet into said cavity, a cover plate over said cavity, an air nozzle associated with said cover plate and directed to blow into said cavity in direction of tape feed to propel and wind the tape in convolutions, transfer means for such convolutions lying in a plane at right angles to the plane of such convolutions, means for moving said cover plate away from said cavity and for moving such convolutions out of said cavity onto said transfer means to encompass the latter, banding means and means associated with said transfer means for elongating such convolutions thereby flattening the latter to form a hank and for bringing such hank into alignment with said banding means.

21. A machine of the character described comprising a winding head having a substantially circular cavity therein, a tape inlet into said cavity, a cover plate closing said cavity, an air nozzle associated with said cover plate and directed to blow into said cavity in direction of tape feed to propel and wind the tape in convolutions, transfer means for such convolutions lying in a plane at right angles to the plane of such convolutions, pusher means in said cavity normally seated on the floor thereof between such convolutions and said floor and movable away from the latter, means for moving said cover plate away from said cavity to open the latter and said pusher means away from said floor of said cavity and moving such convolutions therefrom in a direction at right angles to the plane of such convolutions onto said transfer means to encompass the latter, banding means and means associated with said transfer means for elongating such convolutions thereby flattening the latter to form a hank and for bringing such hank into alignment with said banding means.

22. A machine of the character described comprising a winding head having an annular cavity therein defining an axial hub, means in said head for winding tape in convolutions in said cavity around said hub, a pair of spaced fingers to transfer such convolutions extending at right angles to the plane of such convolutions and normally spaced therefrom with the ends of said fingers lying within the periphery of said hub, means for moving such convolutions from the cavity in said winding head onto said spaced fingers to encompass the latter, means associated with said fingers to effect relative transverse movement therebetween thereby to elongate and flatten such convolutions to form a hank and means for banding such hank.

23. The combination set forth in claim 22 in which means are provided coacting with one of said transfer fingers to grip such convolutions therebetween during the relative transverse movement of said fingers, to prevent unrolling of such convolutions.

24. A machine of the character described comprising a winding head having an annular cavity therein defining an axial hub, means in said head for winding tape in convolutions in said cavity around said hub, means to feed tape into said winding head, means associated with said winding head to sever a predetermined length of tape fed thereto, a pair of spaced relatively movable fingers to support such convolutions, extending at right angles to the plane of such convolutions and normally spaced therefrom with the ends of said fingers lying within the periphery of said hub, pusher means in said winding head to move such convolutions in direction at right angles to the plane thereof out of said winding head onto said spaced fingers to encompass the latter, banding means and means associated with said fingers for effecting relative transverse movement therebetween to separate said fingers thereby to elongate and flatten such convolutions to form a hank and for bringing such hank into alignment with said banding means.

25. A machine of the character described comprising means for winding convolutions from a length of tape, transfer means for such convolutions, means for moving such convolutions from said winding means in a direction at right angles to the plane of such convolutions onto said transfer means to encompass the latter, hank gripping conveyer means including a pair of belts having spaced parallel runs, means associated with said transfer means for elongating such convolutions thereby flattening the latter to form a hank and to move such hank into alignment with the input end of said conveyer, means for positioning a strip of banding material in front of said spaced parallel runs and extending thereacross, means for advancing such hank laterally against such strip and between said spaced parallel runs whereby the rear longitudinal face of the hank will press against such strip and the ends of the strip will extend beyond the front longitudinal face of the hank, means to impart step by step movement to said conveyer means, means to fold the ends of such strip one over the other, and means to seal said folded over ends of such strip.

26. A machine of the character described comprising means for winding convolutions from a length of tape, a pair of spaced fingers to support such convolutions, pusher means associated with said winding means to move such convolutions in direction at right angles to the plane thereof from said winding means onto said spaced fingers to encompass the latter, conveyer means including a pair of belts having spaced parallel runs, means associated with said fingers for effecting relative transverse movement therebetween to separate said fingers thereby to elongate and flatten such convolutions to form a hank and to move such hank into alignment with the input end of said conveyer means, means for positioning a strip of banding material in front of said spaced parallel runs and extending thereacross, means for advancing such hank laterally against such strip and between said spaced parallel runs whereby the rear longitudinal face of the hank will press against such strip and the ends of the strip will extend beyond the front longitudinal face of the hank, means to impart step by step movement to said conveyer belts, means in the path of movement of such strip to fold the ends thereof one over the other, and means to seal said folded over ends of such strip.

27. A machine of the character described comprising a winding head, means for winding tape in convolutions in said winding head, means to feed tape into said winding head, means associated with said winding head to sever a predetermined length of tape fed thereto, a pair of spaced, relatively movable fingers for transfer of such convolutions, pusher means in said winding head to move such convolutions in direction at right angles to the plane thereof out of said winding head onto said spaced fingers to encompass the latter, conveyer means including a pair of belts having spaced parallel adjacent runs, means associated with said fingers for effecting relative transverse movement therebetween to separate said fingers thereby to elongate and flatten such convolutions to form a hank and to move such hank into alignment with the input end of said conveyer means, means for positioning a strip of banding material in front of said spaced parallel runs and extending thereacross, means for advancing such hank laterally against such strip and between said spaced parallel runs whereby the rear longitudinal face of the hank will press against such strip and the ends of the strip will extend beyond the front longitudinal face of the hank, means to impart step by step movement to said conveyer belts, means in the path of movement of said strip to fold the ends of such strip one over the other, and means to seal said folded over ends of such strip.

28. A machine of the character described comprising means for winding tape in convolutions, transfer means for such convolutions lying in a plane at right angles to the plane of such convolutions and associated with said winding means, means for moving such convolutions from said winding means in a direction at right angles to the plane of such convolutions onto said transfer means to encompass the latter, conveyer means, means associated with said transfer means for elongating such convolutions thereby to flatten the latter to form a hank and to move such hank into alignment with said conveyer means, means for positioning a strip of banding material in front of such hank at the input end of said conveyer means, means for simultaneously wrapping said banding strip around said hank and moving such hank onto said conveyer means, and means for sealing said banding strip around such hank.

29. A machine of the character described comprising means for winding tape in convolutions, a pair of parallel spaced fingers to transfer such convolutions, a slidably mounted rod extending at right angles to said fingers, one of said fingers being rigidly mounted on said rod and the other of said fingers being slidably mounted on said rod, resilient means on said rod normally urging said slidable finger away from said rigidly mounted finger, stop means to limit the movement of said slidable finger away from said rigidly mounted finger, means for moving such convolutions from said winding means onto said spaced fingers to encompass the latter, means to move said rod in direction away from said stop means whereby said resilient means will retain said slidable finger against said stop means and said rigidly mounted finger will move away from said slidable finger thereby elongating such convolutions to form a hank and stop means rigidly affixed on said rod, and operatively engaging said slidable finger when the latter and said rigidly mounted finger are spaced a predetermined amount.

30. The combination set forth in claim 29 in which means are provided to grip such convolutions to prevent unrolling thereof, said means comprising a second finger slidably mounted on said rod, stop means to retain said second finger normally spaced from said rigidly mounted finger and means to bring said rigidly mounted finger and said second slidably mounted finger together to clamp said convolutions when said rod is moved in direction away from said first named stop.

31. A machine of the character described comprising a winding head having a substantially circular cavity therein, a tape inlet into said cavity, a cover plate to close said cavity, means for winding convolutions of tape in said cavity, a pair of spaced transfer fingers for such convolutions, means for moving said cover plate away from said cavity, pusher means associated with said last named means for moving such convolutions from said cavity as the latter is opened onto said spaced fingers to encompass the latter, banding means, means associated with said spaced fingers to draw them apart thereby to elongate and flatten such convolutions to form a hank and to bring such hank into alignment with said banding means, said banding means including means for positioning a strip of banding material to the rear of such hank, means for moving such hank laterally against such strip, means to fold the ends of such strip one over the other, and means to seal such folded over ends of such strip.

32. The combination set forth in claim 31 in which the means to fold over the ends of such strip comprises a pair of folding means in the path of movement of such hank and its encompassing strip, and means are provided to advance such hank and such encompassing strip past said folding means to be acted upon thereby.

33. The combination set forth in claim 32 in which the folded over ends of said strip have a thermoplastic coating thereon, and the means to seal said folded over ends of such strip comprise a heating element positioned after said folding means and normally spaced from the folded over edges of such strip, and means are provided to move said heating means against such folded over edges to seal the latter.

34. A machine of the character described comprising means for winding tape in convolutions, a pair of transfer fingers normally spaced from such convolutions and associated with said winding means, means to move such convolutions onto said fingers to encompass the latter, hank gripping conveyer means, a reciprocable drive rod associated with said fingers to separate the latter a predetermined amount to elongate the convolutions thereon into a hank and to move such hank into alignment with said conveyer means, means to transfer such hank from said fingers to said conveyer means, and a transmission from said drive rod to said conveyer means to drive the latter.

35. The combination set forth in claim 34 in which a tape gripping finger is provided on said drive rod associated with one of said transfer fingers normally spaced therefrom and movable thereagainst upon separation of said transfer fingers.

36. A machine of the character described comprising means for winding tape in convolutions, a pair of transfer fingers normally spaced from such convolutions and associated with said winding means, means to move such convolutions onto said fingers to encompass the latter, conveyer means including a pair of belts having spaced parallel runs, a reciprocable drive rod associated with said fingers to separate the latter a predetermined amount to elongate the convolutions thereon into a hank and to move such hank into alignment with the input end of said conveyer means, means to move such hank laterally between said spaced runs to be gripped thereby and a transmission from said drive rod to said conveyer belts to drive the latter.

37. The combination set forth in claim 36 in which said adjacent runs are vertically aligned and means are provided to prevent sagging of the uppermost run.

38. The combination set forth in claim 36 in which said adjacent runs are vertically aligned, the uppermost run is of magnetic material and a magnet is associated with said uppermost run to prevent sagging thereof.

39. A machine of the character described comprising means for winding tape in convolutions, a pair of parallel spaced transfer fingers, means to move such convolutions onto said fingers to encompass the latter, conveyer means including a pair of belts having spaced parallel runs, a slidably mounted drive rod extending at right angles to said fingers, one of said fingers being rigidly mounted on said rod and the other of said fingers being slidably mounted on said rod, resilient means on said rod normally urging said slidable finger away from said rigidly mounted finger, stop means to limit the movement of said slidable finger away from said rigidly mounted finger, means to move said rod in direction away from said stop means whereby said resilient means will retain said slidable finger against said stop means and said rigidly mounted finger will move away from said slidable finger thereby elongating such convolutions to form a hank, stop means rigidly affixed on said rod and operatively engaging said slidable finger when the latter and said rigidly mounted finger are spaced a predetermined amount, said rod being adapted to move such hank into alignment with the input end of said conveyer means, means to move such hank laterally off said transfer fingers between said spaced runs, and a transmission from said drive rod to said conveyer belts to drive the latter.

40. A machine of the character described, comprising means for winding tape in convolutions, a pair of transfer fingers normally spaced from such convolutions and associated with said winding means, a cam shaft, pusher means associated with said winding means and actuated from said cam shaft to move such convolutions onto said fingers to encompass the latter, conveyer means including a pair of belts having spaced parallel runs, a reciprocable drive rod actuated from said cam shaft and associated with said fingers to separate the latter a predetermined amount to elongate the convolutions thereon into a hank and to move such hank into alignment with the input end of said conveyer means, means actuated from said cam shaft to move such hank laterally off said fingers between said spaced runs to be gripped thereby and a transmission from said drive rod to said conveyer belts to drive the latter.

41. The combination set forth in claim 40 in which the transmission from said drive rod to said conveyer belts includes a clutch mechanism which drives said belts during the movement of the drive rod only in direction to separate said fingers.

42. A machine of the character described comprising means for winding tape in convolutions, a pair of transfer fingers normally spaced from such convolutions and associated with said winding means, a cam shaft, pusher means associated with said winding means and actuated from said cam shaft to move such convolutions onto said fingers to encompass the latter, conveyer means including a pair of belts having spaced parallel runs, a barrel cam on said cam shaft, a slidably mounted drive rod actuated from said barrel cam and associated with said fingers to separate the latter a predetermined amount to elongate the convolutions thereon into a hank and to move such hank into alignment with the input end of said conveyer means, means actuated from said cam shaft to move such hank laterally off said fingers between said spaced runs to be gripped thereby, a rack carried by said drive rod, and a gear and overrunning clutch mechanism driven by said rack and operatively connected to said belts whereby upon movement of the drive rod by said barrel cam in direction to separate said fingers said belts will be driven and upon movement of said drive rod in the opposite direction said belts will remain at rest.

43. A machine of the character described comprising means for winding tape in convolutions, transfer means for such convolutions lying in a plane at right angles to the plane of such convolutions, spaced therefrom and associated with said winding means, means for moving such convolutions from said winding means in direction at right angles to the plane of such convolutions onto said transfer means to encompass the latter, conveyer means, means associated with said transfer means for elongating such convolutions thereby to flatten the latter to form a hank and to move such hank into alignment with the input end of said conveyer means, means for positioning a strip of banding material in front of such hank at the input end of said conveyer means, means for simultaneously severing such strip to form a label and for wrapping such label around such hank and moving such hank onto said conveyer means, and means for sealing such label around such hank.

44. A machine of the character described comprising means for winding tape in convolutions, a pair of transfer fingers normally spaced from such convolutions and associated with said winding means, a cam shaft, pusher means associated with said winding means and actuated from said cam shaft to move such convolutions onto said fingers to encompass the latter, conveyer means including a pair of belts having spaced parallel runs, a reciprocable drive rod actuated from said cam shaft and associated with said fingers to separate the latter a predetermined amount to elongate the convolutions thereon into a hank and to move such hank into alignment with the input end of said conveyer means, means for positioning a strip of banding material in front of such hank at the input end of said conveyer means, cutting means associated with such strip, pusher means actuated from said cam shaft, for simultaneously actuating said cutting means to sever such strip to form a label and for moving such hank laterally off said fingers against such label and moving such label and hank between said spaced runs, and means for sealing such label around such hank.

45. The combination set forth in claim 44 in which cutting means are provided associated with such tape, and means are provided actuated from said cam shaft for actuating said cutting means to sever such tape after such convolutions have been wound.

46. The combination set forth in claim 44 in which means are provided to adjust the distance between the parallel runs of the conveyer belts.

47. The combination set forth in claim 44 in which a pair of mounting plates are provided on which said conveyer belts are mounted respectively, said plates having means associated therewith to vary the distance therebetween.

ROBERT G. DEXTER.

References Cited in the file of this patent

UNITED STATES PATENTS

| Number | Name | Date |
|---|---|---|
| 408,216 | Comey | Aug. 6, 1889 |
| 1,915,451 | Schur | June 27, 1933 |
| 1,927,708 | Piec | Sept. 19, 1933 |
| 1,934,471 | Kerr | Nov. 7, 1933 |
| 1,949,544 | Matson | Mar. 6, 1934 |
| 2,006,499 | Fourness et al. | July 2, 1935 |
| 2,155,641 | Buser | Apr. 25, 1939 |
| 2,177,130 | Andrew | Oct. 24, 1939 |
| 2,220,481 | Fritts | Nov. 5, 1940 |
| 2,246,608 | Taylor | June 24, 1941 |
| 2,331,004 | Standish | Oct. 5, 1943 |
| 2,447,982 | Koster | Aug. 24, 1948 |

FOREIGN PATENTS

| Number | Country | Date |
|---|---|---|
| 504,401 | Great Britain | Apr. 25, 1939 |